United States Patent
Ideshio et al.

(10) Patent No.: US 8,771,139 B2
(45) Date of Patent: Jul. 8, 2014

(54) POWER TRANSMISSION UNIT

(75) Inventors: Yukihiko Ideshio, Susono (JP); Hideaki Komada, Gotenba (JP); Takashi Ohta, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 719 days.

(21) Appl. No.: 12/664,709

(22) PCT Filed: Jun. 18, 2008

(86) PCT No.: PCT/JP2008/061504
§ 371 (c)(1),
(2), (4) Date: Dec. 15, 2009

(87) PCT Pub. No.: WO2008/156197
PCT Pub. Date: Dec. 24, 2008

(65) Prior Publication Data
US 2010/0173746 A1 Jul. 8, 2010

(30) Foreign Application Priority Data
Jun. 19, 2007 (JP) ................................. 2007-161772

(51) Int. Cl.
*B60W 10/02* (2006.01)
(52) U.S. Cl.
USPC .................................... 477/8; 477/14; 477/19
(58) Field of Classification Search
USPC ...................................... 475/5, 207, 302, 343
See application file for complete search history.

(56) References Cited

U.S. PATENT DOCUMENTS

| 5,433,282 | A | 7/1995 | Moroto et al. |
| 5,643,119 | A | 7/1997 | Yamaguchi et al. |
| 5,788,006 | A | 8/1998 | Yamaguchi |
| 5,935,035 | A | 8/1999 | Schmidt |
| 6,251,037 | B1 | 6/2001 | Baumgaertner et al. |
| 6,634,986 | B2 * | 10/2003 | Kima .............................. 477/107 |

(Continued)

FOREIGN PATENT DOCUMENTS

| EP | 1 038 722 A1 | 9/2000 |
| EP | 1 209 017 | 5/2002 |

(Continued)

OTHER PUBLICATIONS

U.S. Appl. No. 12/655,348, filed Dec. 18, 2009, Ideshio, et al.

(Continued)

*Primary Examiner* — David D Le
*Assistant Examiner* — Steven B Christ
(74) *Attorney, Agent, or Firm* — Oblon, Spivak, McClelland, Maier & Neustadt, L.L.P.

(57) ABSTRACT

A power transmission unit, including: an engine; a plurality of speed change gear pairs, each having a different gear ratio, and to which a power outputted from the engine is transmitted; an output member outputting the power transmitted from any of the selected speed change gear pair; a differential mechanism, which has three rotary elements performing a differential action, and in which a first rotary element of the three rotary elements is connected with the engine; and an electric motor, connected with a second rotary element of the three rotary elements. The plurality of speed change gear pairs include a first gear pair connected with the first rotary element and the output member, and a second gear pair connected with a third rotary element of the three rotary elements and the output member.

20 Claims, 23 Drawing Sheets

(56) References Cited

U.S. PATENT DOCUMENTS

| | | | |
|---|---|---|---|
| 6,645,105 B2 * | 11/2003 | Kima | 475/5 |
| 6,719,655 B2 * | 4/2004 | Kramer | 475/5 |
| 6,817,327 B2 | 11/2004 | Ehrlinger et al. | |
| 7,128,677 B2 * | 10/2006 | Supina et al. | 475/5 |
| 7,314,421 B2 * | 1/2008 | Kim | 475/5 |
| 7,314,424 B2 * | 1/2008 | Supina et al. | 477/3 |
| 7,575,529 B2 * | 8/2009 | Holmes | 475/5 |
| 8,075,436 B2 * | 12/2011 | Bachmann | 475/5 |
| 2002/0065168 A1 | 5/2002 | Kima | |
| 2003/0045389 A1 * | 3/2003 | Kima | 475/5 |
| 2003/0100395 A1 | 5/2003 | Hiraiwa | |
| 2003/0166429 A1 | 9/2003 | Tumback | |
| 2004/0168841 A1 | 9/2004 | Ohta et al. | |
| 2006/0169078 A1 | 8/2006 | Hiraiwa | |
| 2007/0131046 A1 * | 6/2007 | Borgerson | 74/331 |
| 2007/0254761 A1 * | 11/2007 | Kim | 475/5 |
| 2008/0024268 A1 | 1/2008 | Wong et al. | |
| 2008/0041489 A1 | 2/2008 | Tatsuno | |
| 2008/0242468 A1 | 10/2008 | Wafzig | |
| 2009/0011887 A1 | 1/2009 | Komada et al. | |
| 2009/0170649 A1 | 7/2009 | Murakami et al. | |
| 2010/0173746 A1 * | 7/2010 | Ideshio et al. | 477/36 |

FOREIGN PATENT DOCUMENTS

| | | |
|---|---|---|
| FR | 2 824 509 A1 | 11/2002 |
| JP | 5 319110 | 12/1993 |
| JP | 8-295140 | 11/1996 |
| JP | 2000-69611 | 3/2000 |
| JP | 2000-142139 | 5/2000 |
| JP | 2001 200899 | 7/2001 |
| JP | 2002 204504 | 7/2002 |
| JP | 2003 72403 | 3/2003 |
| JP | 2003-531764 | 10/2003 |
| JP | 2004-161053 | 6/2004 |
| JP | 2004 263708 | 9/2004 |
| JP | 2004 293795 | 10/2004 |
| JP | 2004-322935 | 11/2004 |
| JP | 2005 155891 | 6/2005 |
| JP | 2005 331063 | 12/2005 |
| JP | 2006 38136 | 2/2006 |
| JP | 2006 44521 | 2/2006 |
| JP | 2006 298246 | 11/2006 |
| JP | 2007-519867 | 7/2007 |
| JP | 2007-293795 | 11/2007 |
| WO | WO 03/047898 A1 | 6/2003 |

OTHER PUBLICATIONS

Office Action mailed Feb. 8, 2013, in co-pending U.S. Appl. No. 12/665,348.

Office Action mailed Jan. 18, 2013 in co-pending U.S. Appl. No. 12/995,904.

Office Action issued in co-pending U.S. Appl. No. 12/665,348 on May 30, 2013.

* cited by examiner

Fig. 2

|  | S1 | S2 | SL | | |
|---|---|---|---|---|---|
|  |  |  | Eng Running | EV Running | Regenerating |
| 1st | ① | × | ×→○ | ○ | ○(×) |
| 2nd | × | ② | × | ○ | ○ |
| 3rd | ③ | × | ○ | ○ | ○(×) |
| 4th | × | ④ | × | ○ | ○ |

Fig. 9

| Gear Stage | S11 | S12 | S13 | SL |
|---|---|---|---|---|
| 1st | ① | × | × | ×→○ |
| 2nd | × | ② | × | × |
| 3rd | × | × | ③ | ○ |
| 4th | × | ④ | × | × |
| 5th | × | × | ⑤ | ○ |
| 6th | ⑥ | × | × | × |

| Gear Stage | S1 | S2 | SR | SL |
|---|---|---|---|---|
| 1st | ① | × | × | ×→○ |
| 2nd | × | ② | × | × |
| 3rd | ③ | × | × | ○ |
| 4th | × | ④ | × | × |
| Rev | × | × | ⓡ | ×→○ |

Fig. 13

| Gear Stage | S1 | S2 | SR | SL |
|---|---|---|---|---|
| 1st | ① | × | × | ×→○ |
| 2nd | × | ② | × | × |
| 3rd | ③ | × | × | ○ |
| 4th | × | ④ | × | × |
| 5th | × | × | ⑤ | ○ |
| Rev | × | × | Ⓡ | ×→○ |

Fig. 15

|  | S1 | S2 | SR |
|---|---|---|---|
| 1st | ① | × | × |
| 2nd | × | ② | × |
| 3rd | ③ | × | × |
| 4th | × | ④ | × |
| 5th | × | × | ⑤ |
| Rev | × | × | Ⓡ |

Fig. 16

| | SL | | C1 | |
|---|---|---|---|---|
| | Eng Running | EV Running | Eng Running | EV Running |
| 1st | ×→○ | ○ | ○ | × |
| 2nd | × | ○ | ○ | × |
| 3rd | ○ | ○ | ○ | × |
| 4th | × | ○ | ○ | × |
| 5th | ○ | ○ | ○ | × |
| Rev | ×→○ | ○ | ○ | × |

Fig. 18

|  | A | B | C |
|---|---|---|---|
|  |  |  |  |
| Engine Connection | × | ○ | ○ |
| Planetary Lock | ○ | ○ | × |

Fig. 19

|  | S1 | S2 | SR | SL | |
|---|---|---|---|---|---|
|  |  |  |  | Eng Running | EV Running |
| 1st | ① | × | × | C→B | A |
| 2nd | × | ② | × | C | A |
| 3rd | ③ | × | × | B | A |
| 4th | × | ④ | × | C | A |
| 5th | × | × | ⑤ | B | A |
| Rev | × | × | Ⓡ | C→B | A |

| Gear Stage | S1 | S2 | SL |
|---|---|---|---|
| UD+1st | ① | × | X→M |
| 1st | ① | × | P |
| 2nd | × | ② | × |
| UD+3rd | ③ | × | M |
| 3rd | ③ | × | P |
| 4th | × | ④ | × |

| | | | SL | |
|---|---|---|---|---|
| mode | S1 | S2 | Eng Running | EV Running |
| 1st | ① | × | ×→PL | EL |
| 2nd | × | ② | × | PL |
| 3rd | ③ | × | PL | EL |
| 4th | × | ④ | × | PL |

(a)

(b)

EL : ENG Lock    PL : Planetary Lock    ML : MG Lock    × : Unlock

| mode | S1 | S2 | SL | |
|---|---|---|---|---|
| | | | Eng Running | EV Running |
| UD+1st | ① | × | X→ML | EL |
| 1st | ① | × | PL | EL |
| 2nd | × | ② | × | PL |
| UD+3rd | ③ | × | ML | EL |
| 3rd | ③ | × | PL | EL |
| 4th | × | ④ | × | PL |

POWER TRANSMISSION UNIT

TECHNICAL FIELD

This invention relates to a power transmission unit for a vehicle, which is adapted to transmit a power outputted from a prime mover such as an engine, an electric motor or the like, to an output member such as an output shaft, an output gear or the like. More specifically, the present invention relates to a power transmission unit, which is adapted to vary a ratio between a rotational speed of the prime mover and a rotational speed of the output member.

BACKGROUND ART

In order to vary an output torque according to need, or to control a rotational speed of the prime mover to an efficient speed, the power transmission unit of this kind has been used widely in the prior art. Specifically, a mechanism comprising a plurality of gear pairs is used in general to vary the torque and the rotational speed. In case of using the gear pairs to vary the torque and the rotational speed, power transmission efficiency can be improved in comparison with that in the case of using a belt, a chain or a fluid.

For example, Japanese Patent Laid-Open No. 2002-204504 discloses a power transmitting system composed mainly of a twin-clutch type transmission. The system disclosed in Japanese Patent Laid-Open No. 2002-204504 comprises: two clutch shafts connected selectively with an engine by a clutch; a plurality of gear pairs arranged between the clutch shafts and an output shaft; and a clutch mechanism for connecting the gear pairs selectively with the clutch shaft or with the output shaft. A differential motor generator having a rotor and a stator both of which are rotatable are arranged between those clutch shafts, and connected with each clutch shaft through a bevel gear. That is, the motor generator is arranged perpendicular to the clutch shafts.

On the other hand, Japanese Patent Laid-Open No. 2004-293795 discloses a transmission system, which is adapted to distribute a torque of an engine to two clutch shafts through a differential type motor generator, and to output the torque from the clutch shafts to an output shaft through gear pairs individually set to a predetermined gear ratio.

According to the unit or the system taught by the above-mentioned patent documents, the differential action is achieved between the engine and the clutch shaft or the gear pair. Therefore, the rotational speed of the gear pair attached to one of the clutch shafts can be controlled by the motor generator while transmitting the torque to the output shaft through the other clutch shaft. That is, according to the unit or the system taught by the above-mentioned patent documents, the rotational speed of the gear pair to be used to transmit the torque can be synchronized with the rotational speed thereof before the speed change operation. Therefore, a shift shock can be prevented or minimized, and the output shaft torque can be maintained even during the speed change operation.

However, according to the unit or the system taught by the above-mentioned patent documents, the engine torque is distributed selectively to the two clutch shafts, and the differential type motor generator is arranged between the clutch shafts perpendicular to those clutch shafts through the bevel gear. Therefore, the number of shafts has to be increased and clearances among the shafts have to be widened. For this reason, the power transmission unit is enlarged entirely and a weight thereof is increased.

DISCLOSURE OF THE INVENTION

The present invention has been conceived noting the technical problems thus far described, and its object is to provide a power transmission unit, which is excellent in a power transmission efficiency, which is capable of preventing an occurrence of a shift shock, and which can be downsized easily.

In order to achieve the above-mentioned object, according to the present invention, there is provided a power transmission unit, which has: an engine; a plurality of speed change gear pairs, each of which has a different gear ratio, and to which a power outputted from the engine is transmitted; and an output member for outputting the power transmitted from the speed change gear pair; characterized by comprising: a differential mechanism, which has three rotary elements to perform a differential action, and in which a first rotary element of the three rotary elements is connected with the engine; and an electric motor, which is connected with a second rotary element of the three rotary elements; and characterized in that the plurality of speed change gear pairs include a first gear pair which is adapted to be connected with the first rotary element and the output member, and a second gear pair which is adapted to be connected with a third rotary element of the three rotary element and the output member.

According to the present invention, the power transmission unit further comprises a locking mechanism for connecting the rotary elements with each other thereby rotating the differential mechanism integrally.

The locking mechanism includes a clutch mechanism, which is adapted to unlock the differential mechanism by disconnecting the connected rotary elements in case of outputting the power to the output member through any of the speed change gear pairs, and to lock the differential mechanism by connecting the rotary elements in case of outputting the power to the output member through another speed change gear pair having a gear ratio for setting a gear stage adjacent to the gear stage set by said any of the speed change gear pair.

According to the present invention, the power transmission unit further comprises a starting means, which connects the second gear pair with the third rotary element and the output member when the power is outputted to the output member to start the vehicle while allowing the differential mechanism to perform differential action, and then prevents the differential mechanism from performing differential action.

According to the present invention, the power transmission unit further comprises a motoring/regenerating means, which connects any one of the speed change gear pairs with the output member and any one of the rotary elements, which activates the electric motor, and which prevents the differential mechanism from performing differential action, under the condition where the engine is not driven.

More specifically, a motoring/regenerating means, which connects the second gear pair with the output member and the third rotary element, which activate the electric motor, and which unlocks the differential mechanism thereby allowing the differential mechanism to perform differential action, under the condition where the engine is not driven.

The motoring/regenerating means includes a means for unlocking the differential mechanism in case the rotational speed of the electric motor is higher than that of the engine, and a torque of the electric motor is balanced with a friction torque of the engine.

According to the present invention, the output member includes two output shafts arranged parallel to each other, and driven gears of the speed change gear pairs are arranged on those output shafts at a distance.

Specifically, driven gears of every other speed change gear pairs are arranged in order of gear ratios thereof on one of the output shafts, and driven gears of the remaining speed change gear pairs are arranged on the other output shaft.

According to the present invention, a clutch mechanism for connecting the driven gears on the output shaft selectively with the output shaft is arranged on each output shaft, and one of the clutch mechanisms is arranged on an opposite side of the other clutch mechanism in the axial direction across the driven gears.

According to another aspect of the present invention, the power transmission unit comprises six speed change gear pairs for driving the vehicle in the forward direction. Driven gears of four of said gear pairs are arranged on one of the output shafts in a manner to be connected therewith selectively, and driven gears of the remaining two gear pairs are arranged on the other output shaft in a manner to be connected therewith selectively.

In this case, the power transmission unit of the present invention further comprises: a first clutch mechanism, which allows a gear pair of the largest gear ratio and a gear pair of the smallest gear ratio arranged adjacent to each other on one of the output shafts, to transmit the torque selectively to said one of the output shafts; a second clutch mechanism, which allows a first odd gear pair whose gear ratio is smaller than the largest gear ratio to set a gear stage two stages higher than the gear stage of the largest gear ratio, and a second odd gear pair whose gear ratio is smaller than that of the first odd gear pair to set a gear stage two stages higher than the gear stage set by the first odd gear pair, which are arranged adjacent to each other on the other output shaft, to transmit the torque selectively to said other output shaft; and a third clutch mechanism, which allows a first even gear pair whose gear ratio is smaller than the largest gear ratio to set a gear stage one stage higher than the gear stage of the largest gear ratio, and a second even gear pair whose gear ratio is smaller than that of the first even gear pair to set a gear stage two stages higher than the gear stage set by the first even gear pair, which are arranged adjacent to each other on said one of the output shafts, to transmit the torque selectively to said one of the output shafts.

The power transmission unit of the present invention further comprises a reverse mechanism which outputs a torque transmitted thereto from the differential mechanism while reversing a direction of the torque to be opposite to that of the torque transmitted to the output member through the speed change gear pair.

The reverse mechanism comprises a shifting mechanism which connects the output member selectively with the third rotary element.

The power transmission unit of the present invention further comprises a disconnecting mechanism which disconnects the engine from the first rotary element of the differential mechanism thereby preventing the torque to be transmitted to the first rotary element.

The disconnecting mechanism includes a selective engagement mechanism, which is capable of shifting a sleeve thereof among: a first position, where the engine is disconnected from the first rotary element, and any of the rotary elements of the differential mechanism are connected with each other to lock the differential mechanism; a second position, where the engine is connected with the first rotary element, and any of the rotary elements of the differential mechanism are connected with each other to lock the differential mechanism; and a third position, where the engine is connected with the first rotary element, and the rotary elements of the differential mechanism being connected with each other are disconnected from each other to unlock the differential mechanism.

The power transmission unit of the present invention further comprises an electric motor locking mechanism which halts a rotation of the electric motor.

The electric motor locking mechanism includes a mechanism, which is adapted to halt the rotation of the electric motor in case the second gear pair is connected with the third rotary element and the output member.

The power transmission unit of the present invention further comprises an engine locking mechanism which halts a rotation of the engine.

The engine locking mechanism includes a mechanism, which is adapted to halt the rotation of the engine in case the second gear pair is connected with the third rotary element and the output member, and the electric motor is driven.

The engine locking mechanism includes a mechanism capable of shifting a sleeve thereof among: a first position, where the rotation of the engine is halted; a second position, where any of the rotary elements of the differential mechanism are connected with each other to lock the differential mechanism; and an electric motor locking position, where the rotation of the electric motor is halted.

The differential mechanism includes a planetary gear mechanism comprising: a sun gear as an external gear; a ring gear as an internal gear, which is arranged concentrically with the sun gear; and a carrier, which holds a pinion gear arranged between the sun gear and the ring gear in a rotatable and revolvable manner. The carrier is connected with the engine, and the sun gear is connected with the electric motor.

According to the present invention, a first drive shaft connected with the carrier and a second drive shaft connected with the ring gear are arranged concentrically with each other and coaxially with a rotational center of the planetary gear mechanism, and the drive gears of the speed change gear pairs are arranged on those shafts.

Thus, according to the present invention, the first gear pair is connected with the engine through the third rotary element. Therefore, a gear stage according to the speed change ratio of the first gear pair can be set by connecting the first gear pair with the output member, under the condition where the engine is connected directly with the output member. Meanwhile, the second gear pair is connected directly with the engine by controlling the rotational speed of the electric motor to rotate the differential mechanism integrally. Therefore, a gear stage according to the speed change ratio of the second gear pair can be set by connecting the second gear pair with the output member, under the condition where the engine is connected directly with the output member. This means that the power of the engine can be transmitted to the output member to be outputted therefrom without being converted into an electric power or the like. For this reason, the power transmission efficiency can be improved. Moreover, in case of switching the gear pair to be involved in the transmission of torque between the first gear pair and the second gear pair, the rotational speed of the engine and so on can be synchronized with the rotational speed to be achieved after the speed change operation by varying the rotational speed of the electric motor. Therefore, a shift shock resulting from the switching operation of the gear pair and a resultant change in the rotational speed can be prevented or minimized, and a temporal drop in the torque of the output member can be avoided. Further, the gear pairs can be configured as the conventional gear pairs, and the gear pairs and the output member can be configured as a conventional manual transmission or a twin-clutch type transmission. Specifically, elements constituting a clutch of those conventional transmissions can be replaced by the differential mechanism and the electric motor. Therefore, the power transmission unit can be downsized entirely and the structure thereof can be simplified.

BRIEF DESCRIPTION OF THE DRAWINGS

FIG. 2 is a table showing a relation between gear stages and engagement states of the clutches in the example shown in FIG. 1.

FIG. 9 is a table showing a relation between gear stages and engagement states of the clutches in the example shown in FIG. 8.

FIG. 13 is a table showing a relation between gear stages and engagement states of the clutches in the example shown in FIG. 12.

FIG. 15 is a table showing a relation between gear stages and engagement states of the clutches in the example shown in FIG. 14.

FIG. 16 is a table showing a relation between gear stages and engagement states of a lock clutch and an input clutch in the example shown in FIG. 14.

FIG. 18 is a table showing actions of the lock clutch in the example shown in FIG. 17.

FIG. 19 is a table showing a relation between gear stages and engagement states of the clutches in the example shown in FIG. 17.

BEST MODE FOR CARRYING OUT THE INVENTION

Figure 1:
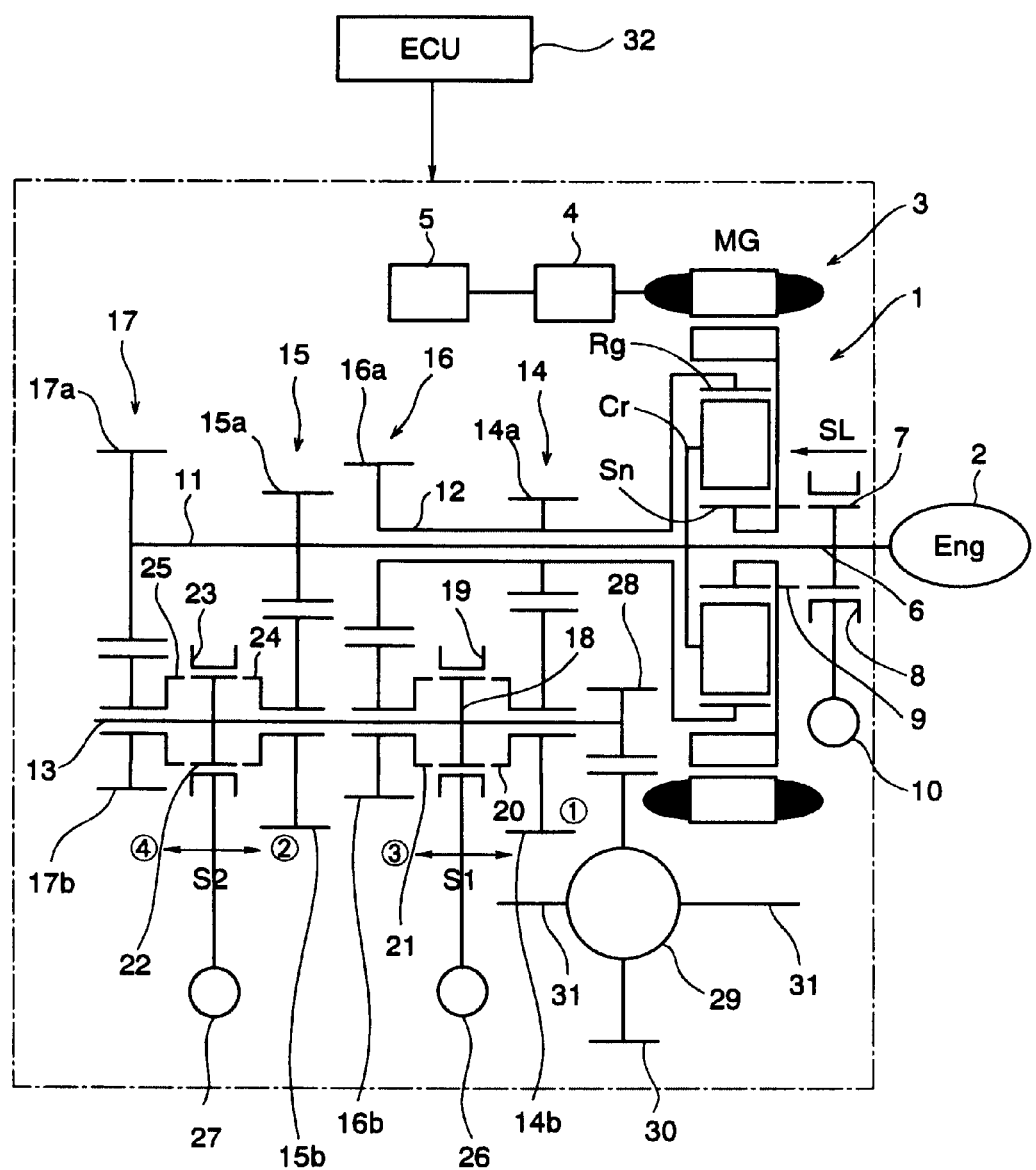
FIG. 1 is a skeleton diagram showing one example of a power transmission unit according to the present invention.

Next, this invention will be described in connection with its specific examples. A power transmission unit according to the present invention is adapted to transmit a power outputted from an engine to an output member through a speed change gear pair selected from a plurality of speed change gear pairs each of which has a different gear ratio, and to output the power from the output member. For example, an internal combustion engine such as a gasoline engine, a diesel engine or the like is typically used as the engine functioning as prime mover, but another kind of power unit e.g., a motor or the like may also be used as the prime mover. The speed change gear pair comprises a drive gear and a driven gear always meshing with each other. Specifically, the speed change gear pair commonly used in a known manual transmission and a twin clutch type transmission for vehicles may be used in the power transmission unit of the present invention. A plurality of speed change gear pairs are required to be arranged in the power transmission unit, and a number of settable speed change ratios (i.e., gear stages) can be increased by increasing a number of the speed change gear pairs. As a result, a rotational speed and a drive torque of the prime mover can be controlled more accurately. In an example shown in FIG. 1, four speed change gear pairs are arranged in the power transmission unit.

According to the present invention, the speed change gear pairs are categorized into a first speed change gear pair and a second speed change gear pair, and a power of the engine is transmitted to the output member selectively from the first speed change gear pair or the second speed change gear pair. In order to switch the power transmission route between the first and the second speed change gear pair systems, the power transmission unit of the present invention is provided with a mechanism composed mainly of a differential mechanism. Specifically, the differential mechanism comprises three rotary elements to perform a differential action, and a single pinion type planetary gear mechanism and a double pinion type planetary gear mechanism are typically used as the differential mechanism. However, mechanisms other than the planetary gear mechanism may also be used as the differential mechanism. In addition, the rotary element is an element of the differential mechanism capable of being connected with some kind of an external member.

The aforementioned three rotary elements are functionally categorized into an input element, an output element and a reaction (or fixed) element. Specifically, according to the present invention, the engine is connected with the input element, the drive gears of the gear pairs are connected with the output element, and the electric motor is connected with the reaction element. Preferably, a motor generator is used as the electric motor, which is adapted not only to output the power when electric power is supplied thereto but also to generate electric power when rotated by an external force. On the other hand, the engine outputs the torque in case a fuel is supplied thereto, but generates a friction torque in case a fuel is not supplied thereto, that is, when it is not activated. Therefore, in case the power transmission unit mounted on the vehicle is connected with a wheel and the electric motor functions as a generator while establishing a negative torque, a power may also be inputted from the output member to the differential mechanism. For this reason, the aforementioned input element, output element and reaction element will not permanently function as the input element, output element and reaction element. For example, the input element may be switched to function as the reaction element, or the reaction element may be switched to function as the output element depending on the situation.

According to the present invention, the differential mechanism can be integrated by the locking mechanism without using the electric motor. Therefore, the power transmission efficiency can be improved in case of setting a gear stage by the first gear pair.

According to the present invention, the power transmission unit comprises the starting means, which connects the second gear pair with the third rotary element and the output member when the power is outputted to the output member to start the vehicle while allowing the differential mechanism to perform differential action, and then prevents the differential mechanism from performing differential action. Therefore, the torques and the rotational speeds of the third rotary element and the second gear pair connected therewith can be varied by varying the torque or the rotational speed of the electric motor when the engine is being driven. Accordingly, the torque outputted from the third rotary element can be increased gradually, by halting the third rotary element by controlling the electric motor when the engine is being driven, and further controlling the electric motor. Then, the engine can be connected directly with the second gear pair by locking the differential mechanism. For this reason, it is unnecessary to arrange a mechanism for keeping the rotation of the engine when the rotation of the output member is halted, or a mechanism for starting the vehicle. Consequently, the power transmission unit can be downsized entirely.

According to the present invention, the power transmission unit further comprises a motoring/regenerating means, which connects any one of the speed change gear pairs with the output member and any one of the rotary elements, which activates the electric motor, and which prevents the differential mechanism from performing differential action, under the condition where the engine is not driven. Therefore, the output member can be connected with the differential mechanism through any one of the speed change gear pairs in a manner to transmit the torque, and the differential mechanism can be prevented from performing the differential action to be rotated integrally. As a result, the electric motor connected with the differential mechanism is connected directly with the output member through any one of the speed change gear pair.

Accordingly, the power of the electric motor can be outputted from the output member by feeding the current to the electric motor to drive the electric motor. To the contrary, the electric motor is allowed to serve as a generator to regenerate the energy by transmitting the power of the output member thereto to rotate the electric motor compulsory.

According to the present invention, the power transmission unit further comprises the a motoring/regenerating means, which connects the second gear pair with the output member and the third rotary element, which activate the electric motor, and which unlocks the differential mechanism thereby allowing the differential mechanism to perform differential action, under the condition where the engine is not driven. In case the engine is not driven, a resistance of the engine acts as a reaction against the first rotary element. Therefore, the torque of the electric motor can be transmitted to the output member and the power of the output member can be transmitted to the electric motor, by unlocking the differential mechanism to perform the differential action, and by connecting the second gear pair with the output member in a manner to transmit the torque. For this reason, the power of the electric motor can be outputted from the output member, by driving the electric motor by applying the current thereto under the gear stage set by the second gear pair. Moreover, the electric motor is allowed to serve as a generator to regenerate energy, by transmitting the power of the output member to the electric motor to rotate the electric motor compulsory.

According to the present invention, the motoring/regenerating means includes a means for unlocking the differential mechanism in case the rotational speed of the electric motor is higher than that of the engine, and a torque of the electric motor is balanced with a friction torque of the engine. Therefore, the friction torque of the engine acting as a reaction against the first rotary element of the differential mechanism is balanced with the torque of the electric motor connected with the second rotary element. In this situation, the rotational speed of the electric motor is higher than that of the engine. That is, in case of regenerating the energy by rotating the electric motor by the power from the output member, a percentage of the electric energy converted by the electric motor is increased. Therefore, regeneration efficiency can be improved in comparison with the case of regenerating energy by the electric motor by locking the differential mechanism.

According to the present invention, the output member includes two output shafts arranged parallel to each other, and driven gears of the speed change gear pairs are arranged on those output shafts at a distance. Since two of the output shafts on which the driven gears are arranged are provided, the number of the driven gear to be arranged in the axial direction can be reduced. Therefore, the lengths of the output shafts can be shortened relatively so that the power transmission unit is downsized entirely.

According to the present invention, the gear pairs having gear ratios for setting the gear stages adjacent to each other are individually connected with the different rotary elements and the output shafts. For the sake of explanation, the gear stage set by the gear pair of the largest speed change ratio is called as the first speed change ratio (or the first gear stage), and the gear stage adjacent to the gear stage set by the gear pair of the largest speed change ratio is called as the second speed change ratio (or the second gear stage). On that condition, according to the power transmission unit of the present invention, the two gear pairs for setting the odd stages (or odd ratios), or the two gear pairs for setting the even stages (or odd ratios) can be connected selectively with the output member or the any of the rotary elements by a common connecting mechanism arranged between those gear pairs. Therefore, the number of the parts can be reduced. For this reason, the structure of the power transmission unit can be simplified and the power transmission unit can be downsized entirely.

According to the present invention, the clutch mechanism for connecting the driven gears on the output shaft selectively with the output shaft is arranged on each output shaft, and one of the clutch mechanisms is arranged on an opposite side of the other clutch mechanism in the axial direction across the driven gears. Thus, the position of the clutch mechanism arranged on one of the output shafts and the position of the clutch mechanism arranged on the other output shaft are offset with each other in the axial direction. That is, those clutch mechanisms are not overlapped in the radial direction so that the distance between the output shafts can be shortened. Therefore, the power transmission unit can be downsized entirely.

According to another aspect of the present invention, the power transmission unit comprises six speed change gear pairs for driving the vehicle in the forward direction. The driven gears of four of said gear pairs are arranged on one of the output shafts in a manner to be connected therewith selectively, and driven gears of the remaining two gear pairs are arranged on the other output shaft in a manner to be connected therewith selectively. Alternatively, the power transmission unit of the present invention further comprises: the first clutch mechanism, which allows the gear pair of the largest gear ratio and the gear pair of the smallest gear ratio arranged adjacent to each other on one of the output shafts selectively to transmit the torque selectively to said one of the output shafts; the second clutch mechanism, which allows the first odd gear pair whose gear ratio is smaller than the largest gear ratio to set a gear stage two stages higher than the gear stage of the largest gear ratio, and the second odd gear pair whose gear ratio is smaller than that of the first odd gear pair to set the gear stage two stages higher than the gear stage set by the first odd gear pair, which are arranged adjacent to each other on the other output shaft, to transmit the torque selectively to said other output shaft; and the third clutch mechanism, which allows the first even gear pair whose gear ratio is smaller than the largest gear ratio to set the gear stage one stage higher than the gear stage of the largest gear ratio, and the second even gear pair whose gear ratio is smaller than that of the first even gear pair to set the gear stage two stages higher than the gear stage set by the first even gear pair, which are arranged adjacent to each other on said one of the output shafts, to transmit the torque selectively to said one of the output shafts. Therefore, the clutch mechanism for connecting the gear pairs with the output shaft can be situated between the gear pairs on the output shaft to reduce the number of the elements. For this reason, the power transmission unit can be downsized entirely.

The power transmission unit of the present invention further comprises a reverse mechanism which outputs a torque transmitted thereto from the differential mechanism while reversing a direction of the torque to be opposite to that of the torque transmitted to the output member through the speed change gear pair. Therefore, the direction of the torque appears on the output shaft can be reversed to be opposite to the direction of the torque transmitted through the gear pairs. Therefore, the vehicle on which the power transmission unit is mounted is allowed to drive backwardly.

The reverse mechanism comprises the shifting mechanism which connects the output member selectively with the third rotary element. Therefore, the differential mechanism is allowed to perform the differential action even when starting the vehicle under the reverse stage, as in the aforementioned examples. For this reason, the vehicle is allowed to start smoothly in the backward direction under the reverse stage without requiring any special mechanisms for starting the vehicle.

The power transmission unit of the present invention further comprises the disconnecting mechanism which disconnects the engine from the first rotary element of the differential mechanism to prevent the torque to be transmitted to the first rotary element. Since the engine can be disconnected from the differential mechanism by the disconnecting mechanism, the engine will not be rotated concurrently even in case of rotating the electric motor by the power transmitted from the output member.

According to the present invention, the disconnecting mechanism includes the selective engagement mechanism, which is capable of shifting a sleeve thereof among: the first position, where the engine is disconnected from the first rotary element, and any of the rotary elements of the differential mechanism are connected with each other to lock the differential mechanism; a second position, where the engine is connected with the first rotary element, and any of the rotary elements of the differential mechanism are connected with each other to lock the differential mechanism; and the third position, where the engine is connected with the first rotary element, and the rotary elements of the differential mechanism being connected with each other are disconnected from each other to unlock the differential mechanism. Thus, the power transmitting condition or operating mode can be shifted among three modes by one selective engagement mechanism. Therefore, the shifting mechanism for shifting the power transmitting condition or operating mode can be structurally simplified.

The power transmission unit of the present invention further comprises an electric motor locking mechanism which halts a rotation of the electric motor connected with the second rotary element of the differential mechanism. Therefore, the rotation of the second rotary element is halted by locking the electric motor. In this situation, the differential mechanism functions as a transmission so that the torque outputted from the engine is outputted from the differential mechanism while being amplified or damped. Thus, a speed change can be carried out by both of the differential mechanism and the speed change gear pairs. As a result, the number of settable speed change ratios (i.e., gear stages) can be increased more than the number of the gear pairs. In addition, in case of carrying out a speed change operation by switching the speed change gear pair to be involved in the torque transmission, a rotational speed of the gear pair to be involved in the torque transmission after the speed change operation can be synchronized with the rotational speed thereof after the speed change operation by the electric motor, by unlocking the electric motor.

According to the present invention, the electric motor locking mechanism includes a mechanism, which is adapted to halt the rotation of the electric motor in case the second gear pair is connected with the third rotary element and the output member. In case the electric motor is locked, the second rotary element connected with the electric motor functions as a fixing element, the first rotary element connected with the engine functions as an input element, and the third rotary element functions as an output element. Since the third rotary element is thus connected with the output member through the second gear pair, the power outputted from the engine is transmitted to the output member, and the speed of the engine is changed by the differential mechanism and the second gear pair on the way to the output member. That is, the engine is connected with the output member directly and mechanically, therefore, the power can be transmitted efficiently therebetween.

The power transmission unit of the present invention further comprises the engine locking mechanism which halts a rotation of the engine. Therefore, the engine will not be rotated concurrently even in case of transmitting the power outputted from the electric motor to the output member, as well as in case of transmitting the power from the output member to the electric motor. For this reason, the power is prevented from being consumed by the engine, and the energy efficiency is thereby improved.

According to the present invention, the engine locking mechanism includes the mechanism, which is adapted to halt the rotation of the engine in case the second gear pair is connected with the third rotary element and the output member, and the electric motor is driven. Therefore, the engine can be locked in both cases in which the electric motor is driven to output the power, and in which the electric motor is rotated as a generator. Since the engine is thus prevented from rotating concurrently in case the electric motor is connected with the output member through the differential mechanism, the power transmission efficiency between the electric motor and the output member can be improved.

According to the present invention, the engine locking mechanism also includes the mechanism capable of shifting a sleeve thereof among: a first position, where the rotation of the engine is halted; a second position, where any of the rotary elements of the differential mechanism are connected with each other to lock the differential mechanism; and an electric motor locking position, where the rotation of the electric motor is halted. Thus, the engine, the differential mechanism and the electric motor can be locked by one mechanism. Therefore, the mechanism for locking those elements can be structurally simplified, and the power transmission unit is thereby downsized entirely.

According to the present invention, the differential mechanism includes a planetary gear mechanism comprising a sun gear as an external gear; a ring gear as an internal gear, which is arranged concentrically with the sun gear; and a carrier, which holds a pinion gear arranged between the sun gear and the ring gear in a rotatable and revolvable manner. In addition, the carrier is connected with the engine, the sun gear is connected with the electric motor, the first drive shaft connected with the carrier and the second drive shaft connected with the ring gear are arranged concentrically with each other and coaxially with a rotational center of the planetary gear mechanism, and the drive gears of the speed change gear pairs are arranged on those shafts. Therefore, the number of required shafts can be reduced by using a planetary gear mechanism as the differential mechanism. Moreover, since the size of the power transmission unit can be reduced in the radial direction, the power transmission unit can be downsized entirely.

FIG. 1 is a diagram showing an example of a power transmission unit comprising a differential mechanism composed mainly of a single pinion type planetary gear mechanism. As shown in FIG. 1, the single pinion type planetary gear mechanism 1 corresponding to the differential mechanism of the present invention comprises: a sun gear Sn as an external gear; a ring gear Rg as an internal gear, which is arranged concentrically with the sun gear Sn; and a carrier Cr, which holds a pinion gear meshing with the sun gear Sn and the ring gear Rg in a rotatable and revolvable manner.

An engine (ENG) 2 is connected with the carrier Cr. The engine 2 and the planetary gear mechanism 1 are preferably arranged concentrically with each other. However, the engine 2 and the planetary gear mechanism 1 may also be arranged on different axes and connected through a transmission mechanism such as a gear mechanism, a chain and so on. On the other hand, a motor generator (MG) 3 corresponding to the electric motor of the present invention is connected with the sun gear Sn. For example, the motor generator 3 is a permanent magnet type synchronous motor, and a rotor thereof is connected with the sun gear Sn and a stator thereof is fixed to a not shown casing or the like. The motor generator 3 is formed entirely into an annular or a cylindrical shape, and the planetary gear mechanism 1 is arranged in an inner circumferential side of the motor generator 3. That is, the motor generator 3 and the planetary gear mechanism 1 are situated on a substantially same place in the axial direction, and the motor generator 3 and the planetary gear mechanism 1 are overlapped at least partially in a radial direction. For this reason, the motor generator 3 is allowed to output relatively large torque by enlarging the size of the outer circumference thereof, and the inner space of the power transmission unit can be used efficiently by arranging a diametrically large portion of the motor generator 3 in the engine 2 side.

The motor generator 3 is connected with an electric storage device 5 such as a secondary battery or the like through a controller 4 such as an inverter. The controller 4 is adapted to control an output torque and a rotational speed of the motor generator 3 by varying a current or a voltage to be supplied to the motor generator 4, and to control an amount of electricity generated in case the motor generator 3 is rotated compulsory by an external force, as well as the torque required to carry out such generation.

The rotational speed of the sun gear Sn connected with the motor generator 3 can be controlled by controlling the motor generator 3 as explained above. Therefore, the planetary gear mechanism 1 will not perform differential action and will be rotated integrally by synchronizing the rotational speed of the sun gear Sn with the rotational speeds of the carrier Cr and the ring gear Rg. In order to rotate the planetary gear mechanism 1 integrally without consuming the electricity, the power transmission unit of the present invention is provided with a locking mechanism. Specifically, the locking mechanism is adapted to integrate the planetary gear mechanism 1 by connecting at least any two of the rotary elements of the planetary gear mechanism 1 with each other, and the locking mechanism is composed mainly of an engagement mechanism such as a positive clutch (i.e., a dog clutch), a frictional clutch and so on.

Specifically, the example shown in FIG. 1 is provided with a locking mechanism (i.e., a lock clutch) SL for connecting the carrier Cr and the sun gear Sn selectively with each other. For example, the lock clutch SL is composed of a dog clutch, which is adapted to connect the carrier Cr and the sun gear Sn by meshing a sleeve thereof with a spline. Specifically, a hub 7 is formed on an input shaft 6 connecting the engine 2 with the carrier Cr, and a sleeve 8 is engaged with a spline formed on an outer circumferential face of the hub 7 in a manner to move in an axial direction of the hub 7 and to rotate integrally with the hub 7. Meanwhile, a spline 9 to which the sleeve 8 is splined is formed on a member integrated with the sun gear Sn or a member connecting the sun gear Sn with the rotor of the motor generator 3. Thus, the carrier Cr and the sun gear Sn can be connected with each other at least in the rotational direction by moving the sleeve 8 toward the sun gear Sn side thereby splining the sleeve 8 to the spline 9. In order to reciprocate the sleeve 8 in the axial direction, the power transmission unit is provided with an actuator 10. Here, both hydraulic type and electric type actuators may be used as the actuator 10.

A first drive shaft 11 and a second drive shaft 12 are arranged in the opposite side of the engine 2 across the planetary gear mechanism 1. Specifically, the first drive shaft 11 is arranged coaxially with a center axis of the planetary gear mechanism 1 in a rotatable manner, and one of the end portions thereof is connected with the carrier Cr. As described, the carrier Cr is connected with the engine 2, that is, the first drive shaft 11 is also connected with the engine 2. Meanwhile, the second drive shaft 12 is fitted onto the first drive shaft 11 in a manner to rotate relatively with the first drive shaft 11, and one of the end portions of the second drive shaft 12 is connected with the ring gear Rg. According to the example shown in FIG. 1, therefore, the carrier Cr corresponds to the first rotary element of the present invention, the sun gear Sn corresponds to the second rotary element of the present invention, and the ring gear Rg corresponds to the third rotary element of the present invention.

The first drive shaft 11 is longer than the hollow second drive shaft 12, therefore, the first drive shaft 11 protrudes from the second drive shaft 12. An output shaft 13 corresponding to the output member of the present invention is arranged parallel to the drive shafts 11 and 12 in a rotatable manner, and four pairs of speed change gear pairs 14, 15, 16 and 17 are arranged between the output shaft 13 and the drive shafts 11 and 12. Each speed change gear pairs 14, 15, 16 and 17 comprises a drive gear 14a, 15a, 16a and 17a individually, and a driven gear 14b, 15b, 16b and 17b individually meshing with the drive gear 14a, 15a, 16a and 17a. Here, each ratio of teeth number between the drive gears 14a, 15a, 16a and 17a and the driven gear 14b, 15b, 16b and 17b is different from one another, in other words, gear ratios of the speed change gear pairs 14, 15, 16 and 17 are different from one another. That is, those speed change gear pairs 14, 15, 16 and 17 are adapted to set first to fourth gear stages (i.e., speed change ratios) individually, and the gear ratios of those gear pairs 14, 15, 16 and 17 are reduced in sequence.

Specifically, the drive gear 14a of the first gear pair 14 having the largest gear ratio, and the drive gear 16a of the third gear pair 16 having the third largest gear ratio are fitted onto the second drive shaft 12. On the other hand, the drive gear 15a of the second gear pair 15 having the second largest gear ratio, and the drive gear 17a of the fourth gear pair 17 having the smallest gear ratio are fitted onto the portion of the first drive shaft 11 protruding from the second drive shaft 12. That is, the speed change gear pairs 14 and 16 for setting the odd gear stages are arranged between one of the drive shafts 12 and the output shafts 13, and the speed change gear pairs 15 and 17 for setting the even gear stages are arranged between the other drive shaft 11 and the other the output shaft 13.

The driven gear 14b, 15b, 16b and 17b of the speed change gear pairs 14, 15, 16 and 17 are arranged on the output shaft 13 in a manner to rotate around the output shaft 13, in the order of the first driven gear 14b, the third driven gear 16b, the second driven gear 15b, and the fourth driven gear 17b from the right side of FIG. 1.

Those speed change gear pairs 14, 15, 16 and 17 are adapted to be connected selectively with the output shaft 13. For this purpose, the power transmission unit is provided with a clutch mechanism. For example, a frictional clutch, a dog clutch or the like can be used as the clutch mechanism, and the dog clutch is used in the example shown in FIG. 1. In this example, two dog clutches are arranged in the power transmission unit. Specifically, one of the dog clutches is arranged between the first driven gear 14b and the third driven gear 16b, and the other dog clutch is arranged between the second driven gear 15b and the fourth driven gear 17b.

In order to connect the first driven gear 14b and the third driven gear 16b selectively with the output shaft 13, the example shown in FIG. 1 is provided with a clutch S1 for setting the odd gear stages. The clutch S1 is structurally identical to the aforementioned lock clutch SL adapted to lock the planetary gear mechanism 1 thereby integrating the planetary gear mechanism 1. Specifically, the clutch S1 comprises: a sleeve 19, which is splined to a hub 18 integrated with the output shaft 13 in a manner to reciprocate in its axial direction; and a spline 20 integrated with the first driven gear 14b and a spline 21 integrated with the third driven gear 16b situated on both sides of the hub 18. Therefore, the first driven gear 14b is connected with the output shaft 13 through the sleeve 19 and the hub 18 by moving the sleeve 19 toward the first driven gear 14b side thereby engaging the sleeve 19 with the spline 20. Likewise, the third driven gear 16b is connected with the output shaft 13 through the sleeve 19 and the hub 18 by moving the sleeve 19 toward the third driven gear 16b side thereby engaging the sleeve 19 with the spline 21.

Meanwhile, in order to connect the second driven gear 15b and the fourth driven gear 17b selectively with the output shaft 13, the example shown in FIG. 1 is provided with a clutch S2 for setting the even gear stages. The clutch S2 is structurally identical to the aforementioned clutch S1 for setting the odd gear stages. Specifically, the clutch S2 comprises: a sleeve 23, which is splined to a hub 22 integrated with the output shaft 13 in a manner to reciprocate in its axial direction; and a spline 24 integrated with the second driven gear 15b and a spline 25 integrated with the fourth driven gear 17b situated on both sides of the hub 22. Therefore, the second driven gear 15b is connected with the output shaft 13 through the sleeve 23 and the hub 22 by moving the sleeve 23 toward the second driven gear 15b side thereby engaging the sleeve 23 with the spline 23. Likewise, the fourth driven gear 17b is connected with the output shaft 13 through the sleeve 23 and the hub 22 by moving the sleeve 23 toward the fourth driven gear 17b side thereby engaging the sleeve 23 with the spline 25.

In order to reciprocate the sleeve 19 of the dog clutch S1 for setting the odd gear stages and the sleeve 23 of the dog clutch S2 for setting the even gear stages, the example shown in FIG. 1 is provided with an actuator 26 and an actuator 27. Here, both hydraulic type and electric type actuators may be used as the actuators 26 and 27.

The output shaft 13 is connected with the differential 29 functioning as a final reduction mechanism through a counter gear 28 arranged on one of its end portions of the planetary gear 1 side. Specifically, the differential 29 is a known gear mechanism comprising: a differential casing integrated with the ring gear 30 meshing with the counter gear 28; a pinion gear arranged in the differential casing; and one pair of side gears meshing with the pinion gear (the elements listed above are not shown). An axle 31 for transmitting the torque to a wheel (not shown) is connected individually with each side gear. Thus, the power transmission unit shown in FIG. 1 is adapted to serve as a transaxle on the vehicle.

In addition, the power transmission unit shown in FIG. 1 further comprises an electronic control unit (ECU) 32 composed mainly of a microcomputer for controlling a driving mode, a speed change operation and so on by outputting a control command signal to the controller 4 and to the actuators 10, 26 and 27. For example, a drive demand such as an opening degree of an accelerator, a vehicle speed, a rotational speed of the engine, a current speed change ratio and so on are inputted to the electronic control unit 32, and the electronic control unit 32 carries out a calculation on the basis of the inputted data and the data stored in advance such as a speed change diagram (i.e., a speed change map). Then, the electronic control unit 32 outputs a control command signal in accordance with the calculation result.

According to the power transmission unit thus far explained, a predetermined gear stage is set by connecting the first drive shaft 11 or the second drive shaft 12 with the output shaft 13 in a manner to transmit the torque using any of the clutches S1 and S2, and by switching the drive shaft to transmit the torque of the engine 2 between the drive shafts 11 and 12 by the planetary gear mechanism 1. In addition, a rotational speed of the gear to be enabled to transmit the power by the action of the clutch S1 or the clutch S2 is synchronized with the rotational speed thereof to be achieved after the speed change operation by the planetary gear mechanism 1 and the motor generator 3.

FIG. 2 is a table showing a relation between the gear stages set by connecting the engine 2 mechanically and directly with the output shaft 13, and engagement states of the clutches S1, S2 and SL under each gear stage. Circled numbers in FIG. 2 correspond individually to the circled numbers in FIG. 1, that is, the circled numbers represent the speed change gear pairs to be engaged with the sleeve 19 of the clutch S1 or the sleeve 23 of the clutch S2. In addition, "X" in FIG. 2 represents a state in which the clutch is disengaged, and "O" represents a state in which the clutch is engaged thereby locking the planetary gear mechanism 1.

Figure 3:
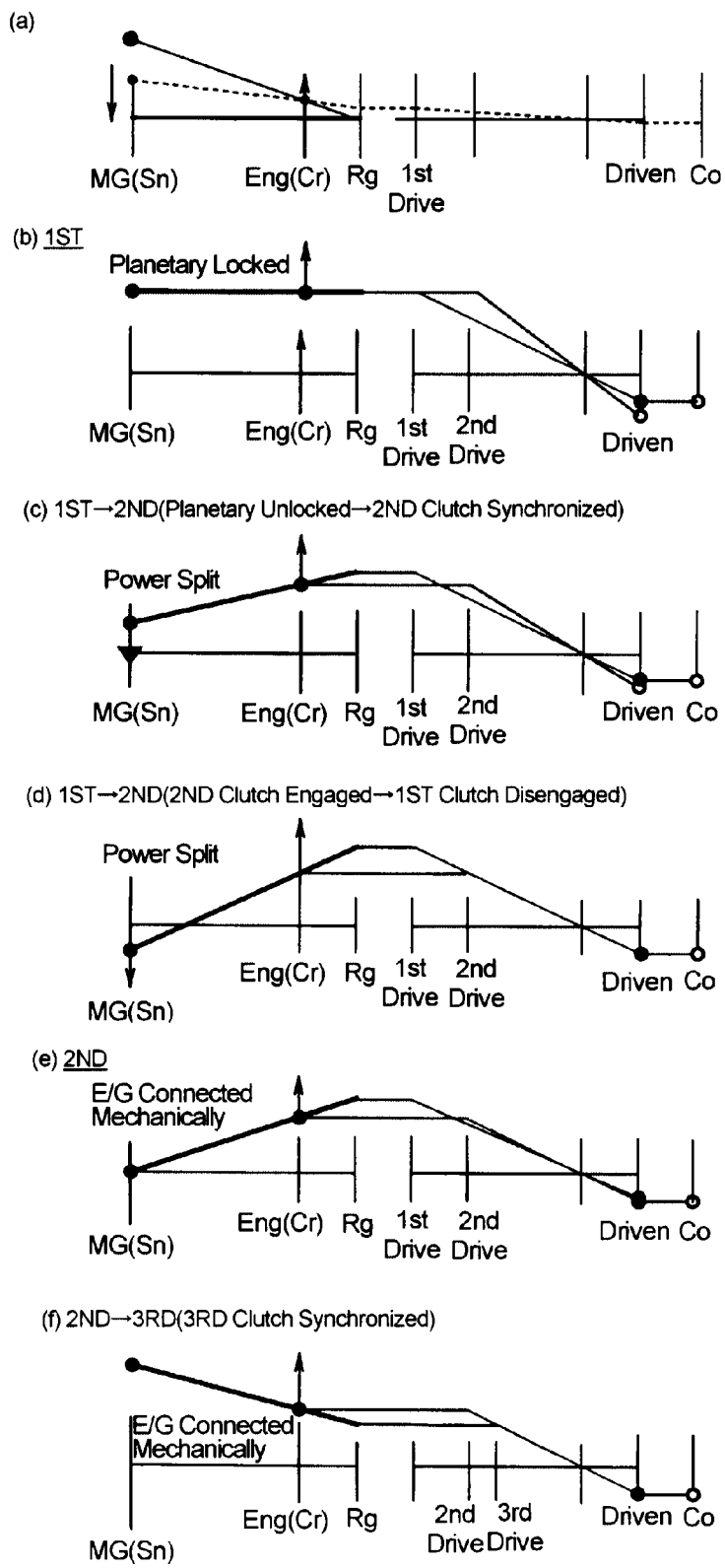
FIG. 3 is nomographic diagrams explaining operating states of the example shown in FIG. 1 from a situation in which the vehicle is stopped to a situation in which the second stage is set.

Here will be explained an action of the power transmission unit shown in FIG. 1. In case of setting the first stage to start the vehicle, the engine 2 is started to be rotated, and the carrier Cr of the planetary gear mechanism 1 is thereby rotated in the forward direction. In this situation, the motor generator 3 is rotated freely or in a manner not to allow the sun gear Sn to establish a reaction force, by controlling the current being supplied thereto. As a result, the ring gear Rg as an output element is kept halted, and the torque is therefore not appears on the ring gear Rg. FIG. 3 is a nomographic diagram of the planetary gear mechanism 1, and this situation is shown in FIG. 3(a). In this situation, the first driven gear 14b is connected with the output shaft 13 by moving the sleeve 19 of the clutch S1 toward the first driven gear 14b side thereby engaging the sleeve 19 with the spline 20. Consequently, the first gear pair 14 is connected with the ring gear Rg and the output shaft 13. However, at this point, the torque has not yet acted on the ring gear Rg. Therefore, the output shaft 13 will not be rotated and the vehicle on which the power transmission unit is mounted has not yet been moved.

Then, when the current being supplied to the motor generator 3 is controlled to use the motor generator 3 as a generator, a reaction force resulting from rotating the motor generator 3 compulsory acts on the sun gear Sn, and a rotational speed of the sun gear Sn is thereby lowered gradually. In this situation, the torque acts on the ring gear Rg to rotate the ring gear Rg in the forward direction, and the rotational speed of the ring gear Rg is thereby raised gradually. This situation is indicated by a broken line in FIG. 3(a). The torque of the ring gear Rg is transmitted to the first drive gear 14a through the second drive shaft 12, and further transmitted to the output shaft 13 from the first gear pair 14 through the clutch S1. As a result, the torque is outputted from the output shaft 13 to both of the wheels 31 through the counter gear (Co) 28 and the differential 29.

In this process, the torque of the engine 2 is outputted to the second drive shaft 12 while being amplified, and the rotational speed of the output shaft 13 is raised gradually even if the rotational speed of the engine 2 is constant. Therefore, the speed change ratio is reduced steplessly, in other words, continuously. Thus, this is a function similar to that of a conventional torque converter being used widely in vehicles.

When the rotational speeds of the motor generator 3 and the sun gear Sn are lowered gradually and the planetary gear mechanism 1 starts rotating integrally, the lock clutch SL being disengaged is engaged. Specifically, the sleeve 8 of the lock clutch SL is moved toward the left side of FIG. 1 to be engaged with the spline 9, and the sun gear Sn and the carrier Cr are thereby connected with each other. As a result, the planetary gear mechanism 1 is locked as shown in FIG. 3(b). Therefore, the power outputted from the engine 2 is transmitted to the second drive shaft 12 as it is, and further transmitted to the output shaft 13 through the first gear pair 14 and the clutch S1. As a result, the first stage connected mechanically and directly is set. In this case, the motor generator 3 is not involved in the power transmission. Therefore, the electric power will not be consumed and the mechanical power will not be converted into the electric power. For this reason, a power loss can be minimized so that the energy efficiency can be improved. A means for engaging the disengaged lock clutch SL during the process from starting the vehicle to set the first stage, more specifically, a functional means for carrying out the above-explained control by the electronic control unit 32 corresponds to the starting means of the present invention.

Under the first stage, the planetary gear mechanism 1 is thus rotated integrally. Accordingly, the first drive shaft 11, and the speed change gear pairs 15 and 17 for setting the even gear stages arranged on the first drive shaft 11 are rotated. A rotational state of the second gear pair 15 is also indicated in FIG. 3(b). Under the first stage, the rotational speed of the second driven gear 15b and the rotational speed of the output shaft 13 are different from each other. Therefore, in case of upshifting to the second stage, a synchronous control is carried out to synchronize those rotational speeds.

Specifically, in case a judgment to carry out an upshifting is satisfied, first of all, the rotational speed of the sun gear Sn is kept to the rotational speed thereof under the first stage by using the motor generator 3 as a generator to generate a negative torque. In this situation, the lock clutch SL is disengaged. Then, the rotational speed of the motor generator 3 is lowered by increasing the negative torque being established by the motor generator 3 itself. In this case, the engine torque is controlled in a manner not to vary the torque of the output shaft 13. The control amount of the engine torque can be calculated by a widely known conventional way, for example, on the basis of the torque of the motor generator 3, a gear ratio of the planetary gear mechanism 1 (i.e., a ratio between the teeth number of the sun gear Sn and the teeth number of the ring gear Rg) and so on.

A transitional state of the upshifting operation, in which the rotational speed of the motor generator 3 is lowered by increasing the negative torque thereof is shown in FIG. 3(c). As shown in FIG. 3(c), the rotational speed of the engine 2 is lowered toward the rotational speed thereof to be achieved under the second stage, while increasing the negative torque being established by the motor generator 3 to keep the rotational speeds and the torques of the ring gear Rg and the output shaft 13, and the rotational speed of the motor generator 3 is lowered. As described, the drive gear 15a of the second gear pair 15 is connected with the engine 2 through the first drive shaft 11 and the carrier Cr. Therefore, the rotational speed of the second drive gear 15a and the rotational speed of the second driven gear 15b meshing therewith are lowered by lowering the rotational speed of the engine 2. Eventually, the rotational speed of the second driven gear 15b is synchronized with the rotational speed of the first output shaft 11 as shown in FIG. 3(d). That is, the synchronous control is completed. In addition, the rotational direction of the motor generator 3 is reversed at this moment so that the motor generator 3 may be used as a motor.

When the synchronization of the rotational speeds is completed, the second driven gear 15b is connected with the output shaft 13 by moving the sleeve 23 of the clutch S2 toward the second gear pair 15 side thereby engaging the sleeve 23 with the spline 24 of the driven gear 15b. As a result, the second gear pair 15 is connected with the carrier Cr and the output shaft 13. At the same time, the clutch S1 is disengaged to disconnect the first driven gear 14b from the output shaft 13. Therefore, the rotational speed will not be varied even when the second gear pair 15 is connected with the output shaft 13 by the clutch C2. For this reason, a shift shock will not be caused by an inertia force. In addition, when the clutch S1 is disengaged, the clutch S2 is being engaged and transmitting the torque to the output shaft 13. Therefore, the torque can be kept transmitted constantly to the output shaft 13 even during the speed change operation. For this reason, an occurrence of the shift shock can be prevented, and the torque will not idle away during the speed change operation. Thus, the driver can be prevented from feeling such uncomfortable feeling.

Under the second stage thus set, the power of the engine 2 is transmitted to the first drive shaft 11 as it is, and further transmitted to the output shaft 13 through the second gear pair 15 and the clutch S2. That is, the second stage is a directly connected stage in which the power of the engine 2 is transmitted directly to the output shaft 13 by a mechanical means, as shown in FIG. 3(e). That is, the motor generator 3 is not necessarily to be used and therefore not especially driven (i.e., turned OFF). For this reason, the power transmission efficiency can be kept preferably so that the fuel economy of the vehicle is improved.

Next, an upshifting operation from the second stage to the third stage will be explained hereinafter. After carrying out such an upshifting, that is, under the third stage, the torque is to be transmitted to the third driven gear 16b. Therefore, in case of carrying out the upshifting from the second stage to the third stage, the rotational speed of the third driven gear 16b is synchronized with the rotational speed of the output shaft 13. Specifically, in case the rotation of the motor generator 3 is halted under the second stage, the third driven gear 16b is rotated at the speed higher than the rotational speed of the output shaft 13. Therefore, in order to synchronize the rotational speed of the third driven gear 16b with the rotational speed of the output shaft 13, the motor generator 3 is driven as a motor in the forward direction as shown in FIG. 3(f) thereby rotating the sun gear Sn connected therewith at the speed higher than the rotational speed of the engine 2. As a result, the rotational speed of the ring gear Rg as an output element is lowered. Here, the rotational speeds of the ring gear Rg and the third gear pair 16 connected therewith are governed by the gear ratio of the planetary gear mechanism 1, the rotational speed of the motor generator 3, and the gear ratio of the third gear pair 16. Therefore, the rotational speed of the motor generator 3 required for synchronizing the rotational speed of the third driven gear 16b with the rotational speed of the output shaft 13 can be calculated and controlled easily.

After thus carrying out the synchronous control, the third driven gear 16b is connected with the output shaft 13 by moving the sleeve 19 of the clutch S1 toward the third driven gear 16b side thereby engaging the sleeve 19 with the spline 21. Meanwhile, the sleeve 23 of the clutch S2 is moved away from the second driven gear 15b to disconnect the second driven gear 15b from the output shaft 13.

An upshifting from the third stage to the fourth stage is a speed change operation from the odd gear stage to the even gear stage. Therefore, the synchronous control and the speed change operation are carried out in the same way as carrying out the speed change operation from the first stage to the second stage. Meanwhile, downshifting operation can be carried out by carrying out the synchronous control and the switching operation of the clutches in the reverse order of carrying out the above-explained control.

Thus, in the power transmission unit according to the present invention, the engine 2, the planetary gear mechanism 1, and the drive shafts 11 and 12 are arranged coaxially, and the output shaft 13 is arranged in parallel with those elements arranged axially. That is, although three shafts are employed, the drive shafts 11 and 12 are arranged concentrically. This means that the number of axes is substantially two in the power transmission unit shown in FIG. 1. Therefore, the power transmission unit can be downsized entirely. In addition, as can be seen from FIG. 1, a configuration of the speed change gear pairs 14, 15, 16 and 17 are similar to that in a manual transmission or a twin-clutch type transmission. Therefore, according to the present invention, a starting clutch (i.e., a clutch to which the power of the engine is imputed, which is disengaged when the vehicle is stopped and when carrying out a speed change operation, and which is engaged when the vehicle is driven) in the manual transmission or the twin-clutch type transmission can be substituted by the aforementioned differential mechanism. For this reason, the power transmission unit of the present invention may not be enlarged larger than the twin-clutch type transmission, in other words, the power transmission unit can be downsized entirely.

According to the present invention, the differential mechanism should not be limited to the single-pinion type planetary gear mechanism. For example, the differential mechanism may also be composed mainly of a double-pinion type planetary gear mechanism. In addition, the roles of the speed change gear pairs 14, 15, 16 and 17 are to transmit the torque between the drive shafts 11 and 12, and the output shaft 13 selectively. Therefore, the drive gears 14a, 15a, 16a and 17a may also be adapted to rotate relatively with the drive shaft 11 and 12, and to be connected selectively with the drive shaft 11 and 12 by a clutch mechanism.

Figure 4:
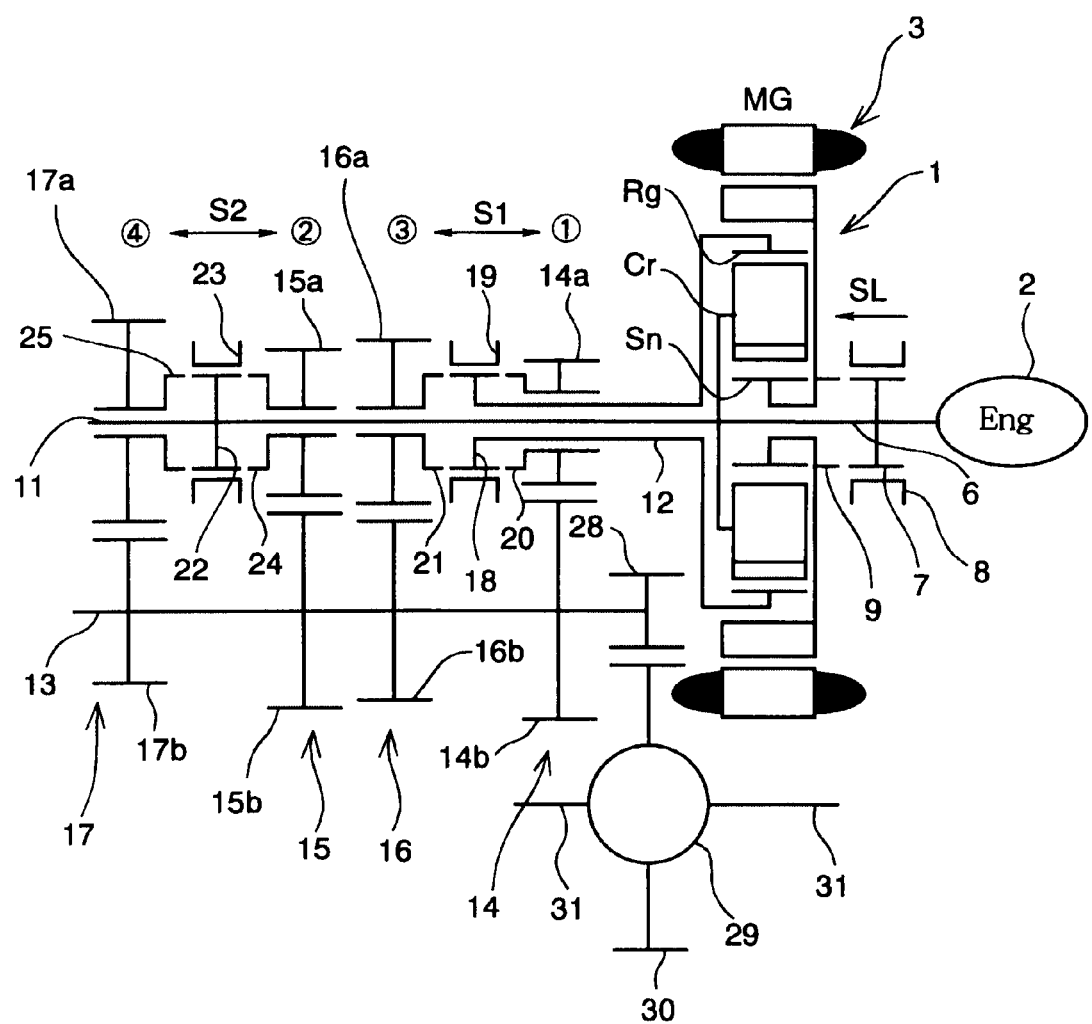
FIG. 4 is a skeleton diagram showing another example of a power transmission unit according to the present invention.

An example of such configuration is shown in FIG. 4. Here, the aforementioned actuators, controller, electric storage device and electronic control unit are omitted from FIG. 4 for the sake of convenience. However, the example shown in FIG. 4 is also provided with those elements as the power transmission unit shown in FIG. 1. In the example shown in FIG. 4, a double-pinion type planetary gear mechanism is used as the planetary gear mechanism 1. In the double-pinion type planetary gear mechanism 1: a pinion gear meshing with the sun gear Sn, and another pinion gear meshing with said pinion gear and the ring gear Rg, are arranged between the sun gear Sn and the ring gear Rg; and those pinion gears are held by the carrier Cr in a rotatable and revolvable manner. As in the example shown in FIG. 1, the engine 2 is connected with the carrier Cr, the motor generator 3 is connected with the sun gear Sn, the first drive shaft 11 is connected with the carrier Cr, and the second drive shaft 12 is connected with the ring gear Rg.

In the example shown in FIG. 4, the first drive gear 14a and the third drive gear 16a are arranged on the second drive shaft 12 in a rotatable manner, and the clutch S1 for setting the odd gear stages is arranged between the drive gears 14a and 16a.

The hub 18 of the clutch S1 is attached to the second drive shaft 12. Meanwhile, the second drive gear 15a and the fourth drive gear 17a are arranged on the first drive shaft 11 in a rotatable manner, and the clutch S2 for setting the even gear stage is arranged between the drive gears 15a and 17a. Accordingly, the driven gears 14b, 15b, 16b and 17b are arranged on the output shaft 13 in a manner to rotate integrally therewith.

As shown in FIG. 3, in the nomographic diagram of the example shown in FIG. 1, the rotary elements of the planetary gear mechanism 1 are situated in the order of the sun gear Sn connected with the motor generator 3, the carrier Cr connected with the engine 2, and the ring gear Rg functioning as an output element. On the other hand, in a nomographic diagram of the example shown in FIG. 4, the rotary elements of the planetary gear mechanism 1 are situated in the order of the sun gear Sn connected with the motor generator 3, the ring gear Rg functioning as an output element, and the carrier Cr connected with the engine 2. However, according to the example shown in FIG. 4, the odd gear stages such as the first and the third stages are set by integrating the planetary gear mechanism 1 by the lock clutch SL, and the even gear stages such as the second and the fourth stages are set by transmitting the power outputted from the engine 2 directly to each gear pair 15 and 17. Therefore, a speed change operation can be carried out while carrying out the synchronous control as in the case of the power transmission unit shown FIG. 1.

Figure 5:
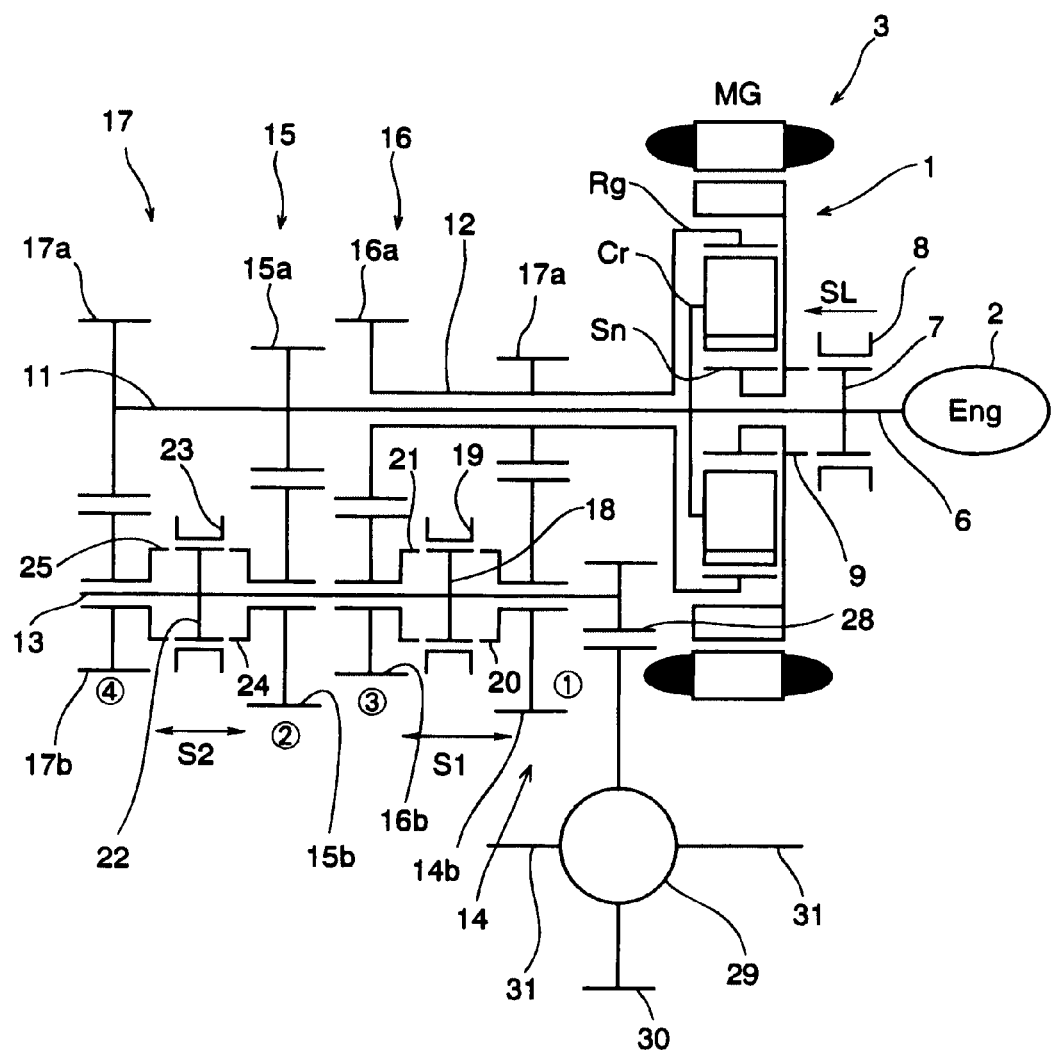
FIG. 5 is a skeleton diagram showing still another example of a power transmission unit according to the present invention.

According to another aspect of the present invention, it is also possible to configure the power transmission unit by combining the differential mechanism shown in FIG. 4 with the gear mechanisms of the example shown in FIG. 1 such as the speed change gear pairs 14, 15, 16 and 17. Such example is shown in FIG. 5. Here, the aforementioned actuators, controller, electric storage device and electronic control unit are omitted from the example shown in FIG. 5 for the sake of convenience. However, the example shown in FIG. 5 is also provided with those elements as the power transmission unit shown in FIG. 1. The example shown in FIG. 5 thus structured is also capable of carrying out a speed change operation while carrying out the synchronous control, as the power transmission units shown in FIGS. 1 and 4.

All of the power transmission units shown in FIGS. 1, 4 and 5 are capable of driving the vehicle by driving the motor generator 3 and regenerating the energy by the motor generator 3 without driving the engine 2. Engagement states of the lock clutch SL of this case are also shown in FIG. 2. As shown in FIG. 2, in case the driving mode is EV running where the engine 2 is not driven and the vehicle is driven by driving the motor generator 3 functioning as a motor, the lock clutch SL is engaged under all of the gear stages thereby integrating the planetary gear mechanism 1 entirely. Therefore, the power outputted from the motor generator 3 is transmitted to each drive shaft 11 and 12 through the planetary gear mechanism 1. The power is further transmitted to the output shaft 13 through any of the speed change gear pair 14, 15, 16 and 17 connected with the output shaft 13 by the clutch S1 or S2. As a result, the vehicle is driven by the power of the motor generator 3.

In case of regenerating energy by using the motor generator 3 as a generator, the planetary gear mechanism 1 is locked or unlocked depending on the situation under the odd gear stages to perform differential action. Meanwhile, the planetary gear mechanism 1 is locked by the lock clutch SL under the even gear stages. Here, the odd gear stages are set by the speed change gear pair connected with the rotary element which is not connected with any of the engine 2 and the motor generator 3, in other words, set by the speed change gear pair connected with the differential element of the planetary gear mechanism 1. On the other hand, the even gear stage is set by the speed change gear pair connected directly with the engine 2.

Accordingly, under the even gear stages, the planetary gear mechanism 1 is rotated integrally by the power inputted from the output shaft 13 side. Therefore, under the even gear stages, the energy can be regenerated into an electric power by the motor generator 3 by rotating the motor generator 3 compulsory while rotating the engine 2. On the other hand, it is also possible to regenerate energy under the odd gear stages by engaging the lock clutch SL. That is, an inertial energy resulting from driving the vehicle can be regenerated into electric energy under both even and odd gear stages. The situation of regenerating the energy is shown in the nomographic diagram of FIG. 6.

Figure 6:
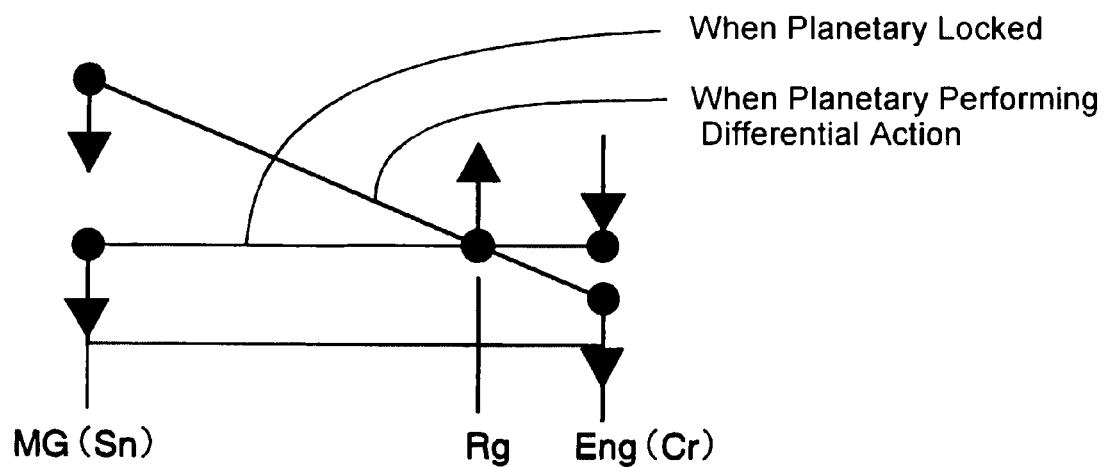
FIG. 6 is a nomographic diagram explaining a situation of the example shown in FIG. 5 in case of regenerating energy.

To the contrary, in case of unlocking the planetary gear mechanism 1 by disengaging the lock clutch SL when the vehicle is running while regenerating the energy under the odd gear stage, the rotational speed of the motor generator 3 may be increased by the friction torque of the engine 2 and the differential action of the planetary gear mechanism 1. For example, the rotational speed of the motor generator 3 can be increased as explained above, in case the rotational speed of the motor generator 3 is higher than that of the engine 2, and the regenerative torque of the motor generator 3 is balanced with the friction torque of the engine 2, as shown in FIG. 6. In this situation, both of the motor generator 3 and the engine 2 are rotated by the torque inputted from the ring gear Rg. However, the friction torque of the engine 2 is acting as a reaction against the carrier Cr, and balanced with the regenerative torque of the motor generator 3. Therefore, the rotational speed of the motor generator 3 is kept at relatively high speed. The generation amount of the motor generator 3 is increased in accordance with an increase in the rotational speed thereof. Accordingly, larger amount of the energy can be regenerated in this case, in comparison with that of the case in which the planetary gear mechanism 1 is locked. Thus, the energy can be regenerated efficiently.

The functional means for locking and unlocking the planetary gear mechanism 1 depending on the gear stage in case of driving the vehicle by the motor generator 3 (i.e., under EV running mode) and in case of driving the vehicle while regenerating energy corresponds to the motoring/regenerating means of the present invention. The motoring/regenerating means is controlled by the aforementioned electronic control unit 32.

Figure 7:
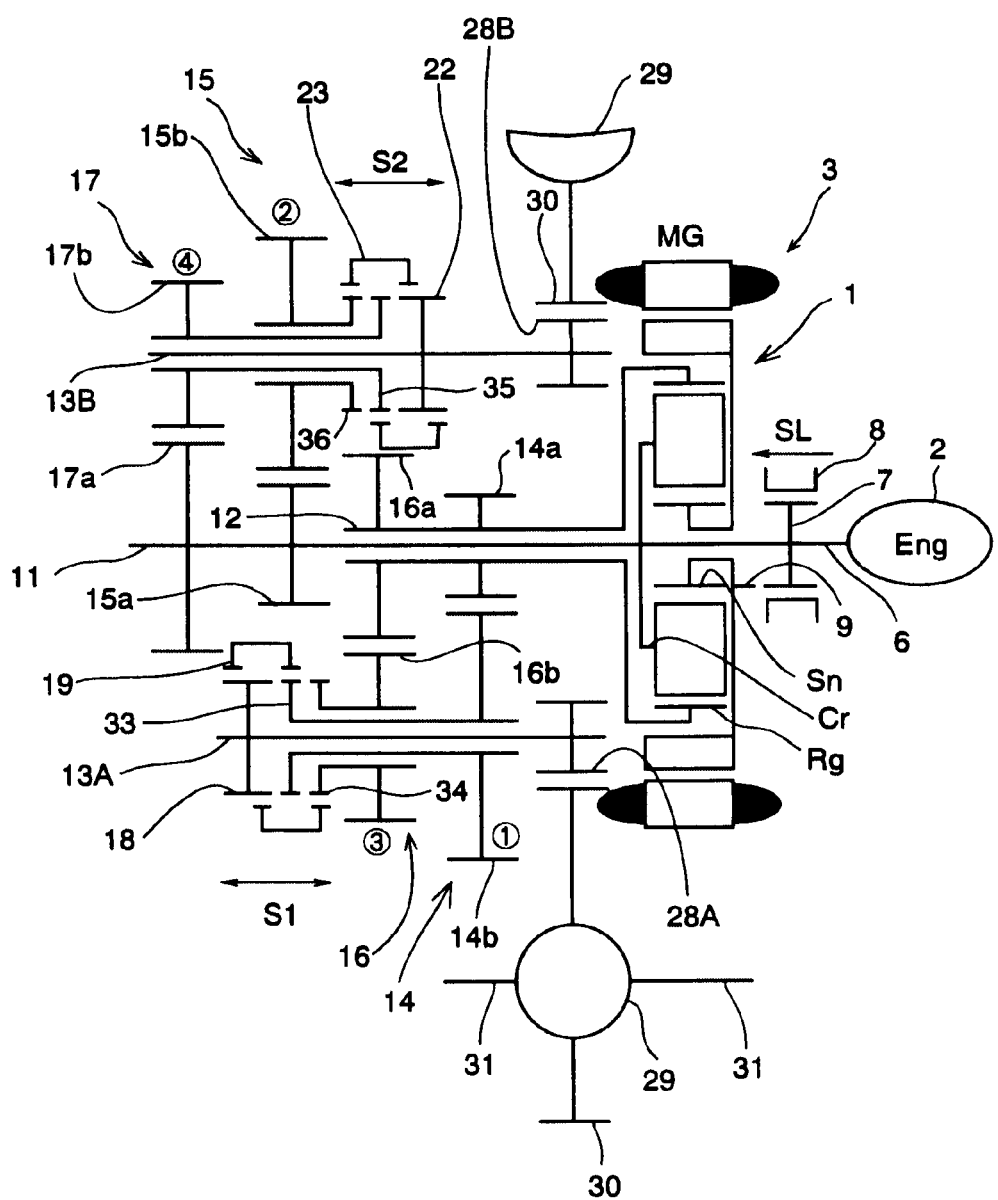
FIG. 7 is a skeleton diagram showing an example of a power transmission unit according to the present invention provided with two output shafts.

Here will be explained another example of the present invention. FIG. 7 shows an example in which two output shafts 13A and 13B are connected with the differential 29 to shorten an axial length of the power transmission unit. Specifically, the output shafts 13A and 13B are individually arranged in parallel with the drive shafts 11 and 12, and counter gears 28A and 28B are individually attached to one of the end portions of the output shafts 13A and 13B to be engaged with the ring gear 30 of the differential 29.

The first driven gear 14b and the third driven gear 16b are arranged on one of the output shafts 13A in a rotatable manner. The clutch S1 for setting the odd gear stages is also arranged on the output shaft 13A on the opposite side of the engine 2 across the driven gears 14b and 16b. The clutch S1 comprises: a hub 18, which is integrated with the output shaft 13A; and a sleeve 19, which is splined onto the hub 18 movably in the axial direction. The first driven gear 14b and the third driven gear 16b are connected selectively with the output shaft 13A by shifting the sleeve 19 among a first position, a neutral position (i.e., disengaging position), and a third position. For this purpose, a hub 33 integrated with the first driven gear 14b and a hub 34 integrated with the third driven gear 16b are aligned with the hub 18 arranged on the output shaft 13A, and the sleeve 19 is adapted to be splined onto those hubs 33 and 34.

The sleeve 19 is a cylindrical member in which a spline is formed on an inner surface of both ends thereof, and the sleeve 19 is shifted by an actuator (not shown) among: a position to be splined to the hub 18 and to the hub 33 of the first driven gear 14b; a position to be splined to the hub 18 without being splined to the hubs 33 and 34; and a position to be splined to the hub 18 and to the hub 34 of the third driven gear 16b.

Meanwhile, the second driven gear 15b and the fourth driven gear 17b are arranged on the other output shaft 13B in a rotatable manner. The clutch S2 for setting the even gear stages is also arranged on the output shaft 13B at a position closer to the engine 2 than the driven gears 15b and 17b. Specifically, the clutch S1 is arranged on an outer circumferential side of the gear pairs 15 and 17, and on the other hand, the clutch S2 is arranged on an outer circumferential side of the speed change gear pair 14 and 16. In other words, the speed change gear pairs 14 and 16 and the speed change gear pairs 15 and 17 are offset with each other in the axial direction, and the clutches S1 and S2 are also offset with each other in the axial direction. Thus, the structural elements are not overlapped in the radial direction so that the external diameter of the power transmission unit can be reduced as small as possible.

The clutch S2 comprises: a hub 23, which is integrated with the output shaft 13B; and a sleeve 23, which is splined onto the hub 22 movably in the axial direction. The second driven gear 15b and the fourth driven gear 17b are connected selectively with the output shaft 13B by shifting the sleeve 23 among a second position, a neutral position (i.e., disengaging position), and a fourth position. For this purpose, a hub 35 integrated with the fourth driven gear 17b and a hub 36 integrated with the second driven gear 15b are aligned with the hub 22 arranged on the output shaft 13B, and the sleeve 23 is adapted to be splined onto those hubs 35 and 36.

The sleeve 23 is also a cylindrical member in which a spline is formed on an inner surface of both ends thereof, and the sleeve 23 is shifted by an actuator (not shown) among: a position to be splined to the hub 22 and to the hub 36 of the second driven gear 15b; a position to be splined to the hub 22 without being splined to the hubs 35 and 36; and a position to be splined to the hub 22 and to the hub 35 of the fourth driven gear 17b. The remaining elements are identical to those of the example shown in FIG. 1. Therefore, further explanation of those elements will be omitted by allotting common reference numerals to FIG. 7. Additionally, the aforementioned actuators, controller, electric storage device and electronic control unit are omitted from the example shown in FIG. 7 for the sake of convenience.

As the aforementioned power transmission unit shown in FIG. 1, the example shown in FIG. 7 is also capable of setting the first to fourth stages. In addition, the example shown in FIG. 7 is also capable of carrying out the starting control for increasing the output torque gradually when starting the vehicle, and carrying out the synchronous control when carrying out a speed change operation. Relations between the gear stages set by the power transmission unit shown in FIG. 7, and engagement states of the clutches SL, S1, and S2 under each gear stage are identical to those shown in FIG. 2. Therefore, the circled numbers in FIG. 7 also correspond to those in FIG. 2.

Figure 8:
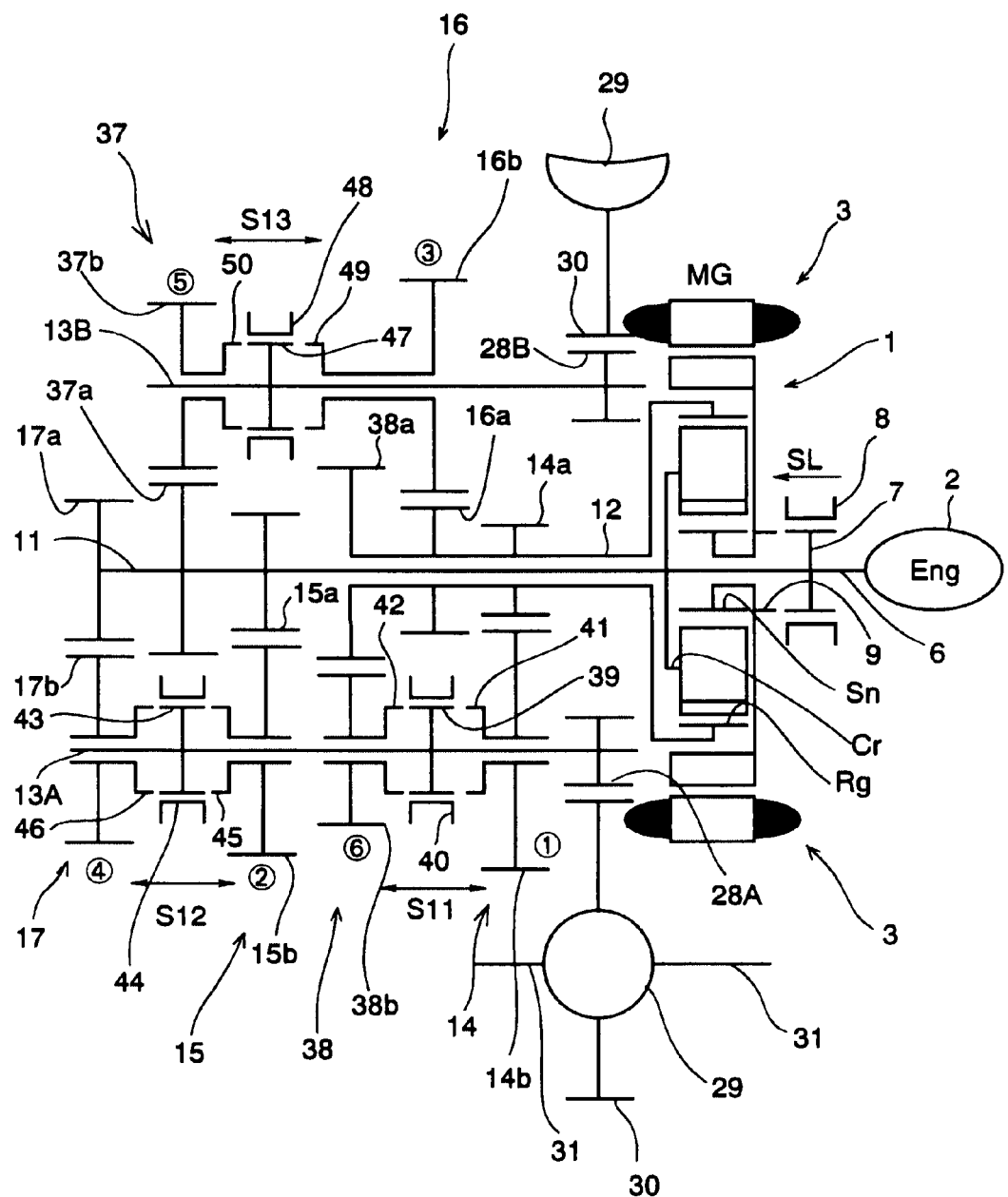
FIG. 8 is a skeleton diagram showing another example of a power transmission unit according to the present invention provided with two output shafts.

In case of thus arranging the two output shafts 13A and 13B, the number of settable gear stages can be increased easily while preventing the axial length of the power transmission unit from being elongated. Such example is shown in FIG. 8. Specifically, in the example shown in FIG. 8, six pairs of speed change gear pairs 14, 15, 16, 37 and 38 are arranged to set six gear stages. As shown in FIG. 8, the first drive gear 14a, the third drive gear 16a, and a sixth drive gear 38a are arranged in order on the second drive shaft 12. Meanwhile, the first driven gear 14b, and a sixth driven gear 38b meshing with the sixth drive gear 38a are arranged on one of the output shafts 13A in a rotatable manner. Therefore, the third driven gear 16b is arranged on the other output shaft 13B in a rotatable manner.

On the other hand, the second drive gear 15a, the fifth drive gear 37a, and the fourth drive gear 17a are arranged on the first drive shaft 11 in order and integrated therewith. Meanwhile, a fifth drive gear 37b meshing with the fifth drive gear 37a is arranged on the other output shaft 13B in a rotatable manner. Therefore, the second driven gear 15b and the fourth driven gear 17b are arranged on said one of the output shaft 13A in a rotatable manner.

In order to enable the speed change gear pairs 14, 15, 16, 17, 37 and 38 to transmit the torque selectively to the output shafts 13A and 13B, there are provided three clutches S11, S12, and S13. Those clutches S11, S12, and 13 are structurally identical to the aforementioned clutches SL, S1 and S2. That is, the clutches S11, S12, and S13 are adapted to connect the driven gears selectively with the output shafts 13A and 13B by moving the sleeve thereof in its axial direction.

Specifically, the first clutch S11 is arranged between the first driven gear 14b and the sixth driven gear 38b, and the first clutch S11 comprises: a sleeve 40, which is splined to a hub 39 integrated with the output shaft 13A in a manner to reciprocate in its axial direction; and a spline 41 integrated with the first driven gear 14b and a spline 42 integrated with the sixth driven gear 38b situated on both sides of the hub 39. Therefore, the first driven gear 14b is connected with the output shaft 13A through the sleeve 40 and the hub 39 by moving the sleeve 40 toward the first driven gear 14b side thereby engaging the sleeve 40 with the spline 41. Likewise, the sixth driven gear 38b is connected with the output shaft 13A through the sleeve 40 and the hub 39 by moving the sleeve 40 toward the sixth driven gear 38b side thereby engaging the sleeve 40 with the spline 42.

The second clutch S12 is arranged between the second driven gear 15b and the fourth driven gear 17b on the first output shaft 13A, and the second clutch S12 comprises: a sleeve 44, which is splined to a hub 43 integrated with the output shaft 13A in a menner to reciprocate in its axial direction; and a spline 45 integrated with the second driven gear 15b and a spline 46 integrated with the fourth driven gear 17b situated on both sides of the hub 43. Therefore, the second driven gear 15b is connected with the output shaft 13A through the sleeve 44 and the hub 43 by moving the sleeve 44 toward the second driven gear 15b side thereby engaging the sleeve 44 with the spline 45. Likewise, the fourth driven gear 17b is connected with the output shaft 13A through the sleeve 44 and the hub 43 by moving the sleeve 44 toward the fourth driven gear 17b side thereby engaging the sleeve 44 with the spline 46. Thus, the second clutch S12 is structurally identical to the aforementioned clutch S2 for setting the even gear stages.

The third clutch S13 is arranged between the third driven gear 16b and the fifth driven gear 37b on the second output shaft 13B, and the third clutch S13 comprises: a sleeve 48, which is splined to a hub 47 integrated with the output shaft 13B in a menner to reciprocate in its axial direction; and a spline 49 integrated with the third driven gear 16b and a spline 50 integrated with the fifth driven gear 37b situated on both sides of the hub 47. Therefore, the third driven gear 16b is connected with the output shaft 13B through the sleeve 48 and the hub 47 by moving the sleeve 48 toward the third driven gear 16b side thereby engaging the sleeve 48 with the spline 49. Likewise, the fifth driven gear 37b is connected with the output shaft 13B through the sleeve 48 and the hub 47 by moving the sleeve 48 toward the fifth driven gear 37b side thereby engaging the sleeve 48 with the spline 50.

Although not especially shown, the example shown in FIG. 8 is also provided with actuators for reciprocating the sleeves 40, 44 and 48 of the clutches S11, S12 and S13 in its axial direction. Therefore, the driven gears 14b, 15b, 16b, 17b, 37b and 38b are connected selectively with the output shaft 13A or 13B by the actuator in accordance with a command signal outputted from the aforementioned electronic control unit. According to the example shown in FIG. 8, a double pinion type planetary gear mechanism is used as the planetary gear mechanism 1. The remaining elements are identical to those in the examples shown in FIGS. 5 and 7. Therefore, further explanation for those elements will be omitted by allotting common reference numerals to FIG. 8. In addition, the actuators, the controller, the electric storage device, and the electronic control unit are omitted from FIG. 8.

Thus, the example shown in FIG. 8 is capable of setting six forward stages. FIG. 9 is a table showing a relation between the gear stages set by the power transmission unit shown in FIG. 8, and engagement states of the clutches S11, S12 and S13 under each gear stage. Definitions of the symbols in FIG. 9 are identical to those in FIG. 2, and circled numbers in FIG. 9 correspond individually to those in FIG. 8.

Accordingly, as the power transmission unit shown in FIG. 7, the power transmission unit shown in FIG. 8 is also capable of setting the first to fourth stages, as well as setting the fifth and sixth stages. Moreover, according to the example shown in FIG. 8, the speed change gear pair 14 for setting the lowest gear stage and the speed change gear pair 38 for setting the highest gear stage are arranged adjacent to each other, and the clutch S11 is arranged between the speed change gear pairs 14 and 38. Therefore, the number of the clutches can be reduced smaller than the number of settable gear stages. As a result, the power transmission unit can be downsized entirely and cost of the power transmission unit can also be reduced. Further, the example shown in FIG. 8 is also capable of carrying out the starting control for increasing the output torque gradually when starting the vehicle, and carrying out the synchronous control when carrying out a speed change operation. Furthermore, the example shown in FIG. 8 is capable of setting the sixth stage which is to be set relatively frequently when the vehicle is running, that is, capable of setting a highly important gear stage. Additionally, the example shown in FIG. 8 is capable of skipping the gear stages bi-directionally in case of shifting the gear stage, between the sixth and the third stages, between the fifth and the second stages, and between the fourth and the first stages, while carrying out the synchronous control.

Figures 10, 11:
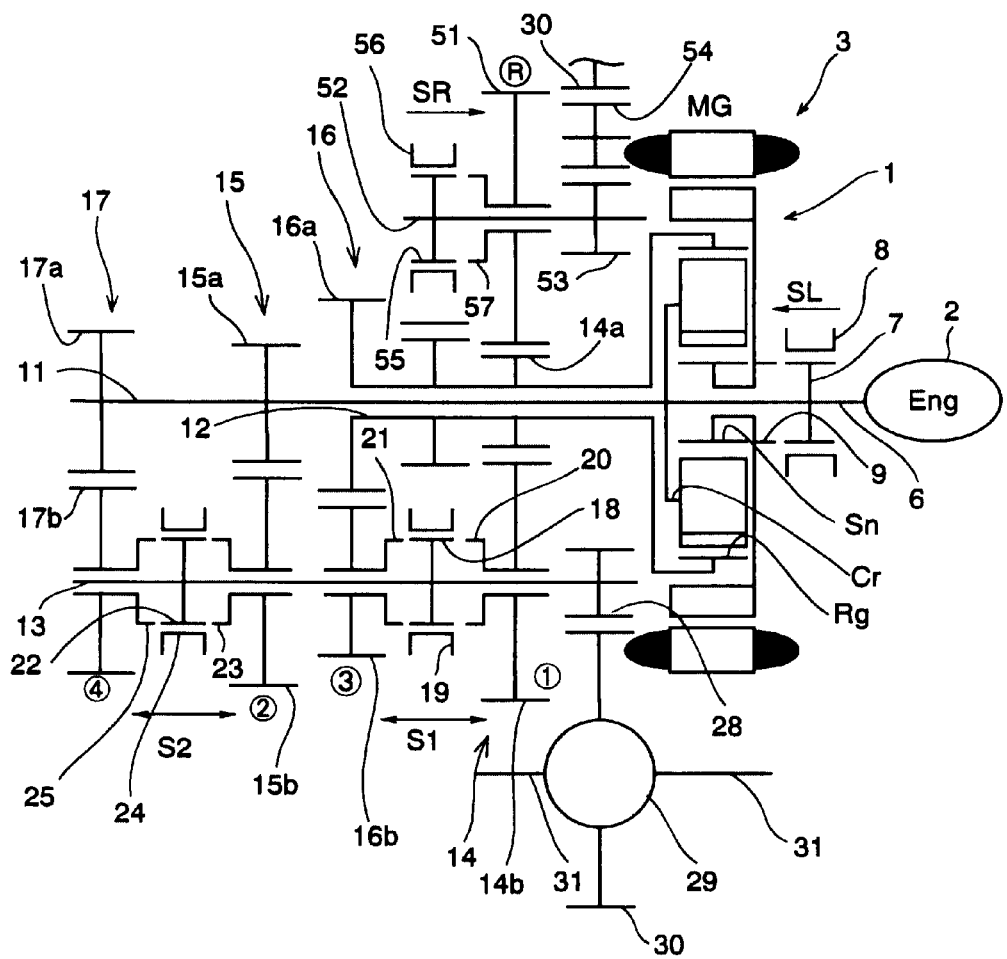
FIG. 10 is a skeleton diagram showing an example of a power transmission unit according to the present invention provided with a gear pair for setting a reverse stage.
FIG. 11 is a table showing a relation between gear stages and engagement states of the clutches in the example shown in FIG. 10.

In the above-explained examples, the power transmission units are adapted to drive the vehicle backwardly by transmitting the power of the motor generator 3 to a drive wheel (not shown), while rotating the motor generator 3 in the direction opposite to the direction of driving the vehicle in the forward direction. Accordingly, the motor generator 3, and the predetermined gear pair such as the first gear pair 14 for transmitting the output torque of the motor generator 3 to the drive wheel when driving the vehicle backwardly correspond to the reverse mechanism of the present invention. According to the present invention, the vehicle can also be driven backwardly by the power of the engine 2. FIG. 10 is a skeleton diagram showing an example of such configuration. In the example shown in FIG. 10, a gear train for setting a reverse stage is added into the structure shown in FIG. 5. Therefore, further explanation of the elements in common with those in FIG. 5 will be omitted by allotting common reference numerals to FIG. 10.

As shown in FIG. 10, a reverse driven gear 51 is engaged with the first driven gear 14b arranged on the second output shaft 12, and the reverse driven gear 51 is held rotatably on a counter shaft 52 arranged in parallel with the output shafts 11 and 12. In addition, a counter gear 53 is arranged on the counter drive shaft 52, and an idle gear 54 is interposed between the counter gear 53 and the ring gear 30 of the differential 29 to be engaged with the counter gear 53 and the ring gear 30.

In addition, the power transmission unit shown in FIG. 10 is provided with a reverse clutch SR adapted to connect the reverse driven gear 51 selectively with the counter shaft 52. A structure of the reverse clutch SR is similar to that of the aforementioned clutches in principle. Specifically, the reverse clutch SR comprises: a sleeve 56, which is splined to the hub 55 integrated with the counter shaft 52 in a manner to reciprocate in the axial direction; and a spline 57, which is arranged adjacent to the hub 55, and which is integrated with the reverse driven gear 51. Therefore, the reverse driven gear 51 is connected with the counter shaft 52 through the sleeve 56 and the hub 55 by moving the sleeve 56 toward the reverse driven gear 51 side thereby engaging the sleeve 56 with the spline 57.

Thus, according to the example shown in FIG. 10, the first drive gear 14a also functions as a reverse drive gear. Therefore, the power transmitted from the first drive gear 14a to the reverse driven gear 51 is further transmitted to the differential 29 while being reversed by the idle gear 54. As a result, the reverse stage is set. FIG. 11 is a table showing a relation between the gear stages set by the power transmission unit shown in FIG. 10, and engagement states of the clutches S1, S2, SR and SL under each gear stage. The engagement states of those clutches under the first stage to the fourth stage are identical to those under the first stage to the fourth stage of engine running mode (Eng Running) in FIG. 2, and also identical to those under the first stage to the fourth stage in FIGS. 9 and 13. That is, the first stage to the fourth stage can be set in the example shown in FIG. 10 by disengaging (or neutralizing) the reverse clutch SR while operating the remaining clutches S1, S2 and SL as explained above.

In case of setting the reverse stage in the example shown in FIG. 10, the reverse driven gear 51 is connected with the counter shaft 52 by moving the reverse clutch SR toward the right side in FIG. 10 (as represented by (R) in FIG. 11), the clutch S1 for setting the odd gear stages and the clutch S2 for setting the even gear stages are disengaged (or neutralized), and the lock clutch SL is disengaged. After the vehicle is started, the lock clutch SL is engaged to integrate the planetary gear mechanism 1. Thus, the lock clutch SL is controlled in the same way as in the case of starting the vehicle under the first stage. Therefore, the vehicle is allowed to start smoothly under the reverse stage without requiring any special clutch (i.e., a starting clutch). Moreover, according to the example shown in FIG. 10, the rotary element of the planetary gear mechanism 1 outputting the torque to the reverse driven gear 51 is connected neither with the engine 2 nor with the motor generator 3. Therefore, the power transmission efficiency and fuel economy can be improved by locking the planetary gear mechanism 1 to rotate the planetary gear mechanism integrally.

Thus, according to the example shown in FIG. 10, the reverse stage is set by operating the clutches S1, S2, SR and SL as explained above, thereby transmitting the torque outputted from the engine 2 to the reverse driven gear 51 through the second drive shaft 12 and the first drive gear 14a integrated therewith, and further transmitting the torque from the reverse driven gear 51 to the ring gear 30 of the differential 29 through the counter gear 53 and the idle gear 54. Since the reverse stage is set by thus transmitting the torque from the first drive gear 14a of the largest gear ratio, a required vehicle speed and a driving force can be ensured even under the reverse stage.

Figure 12:
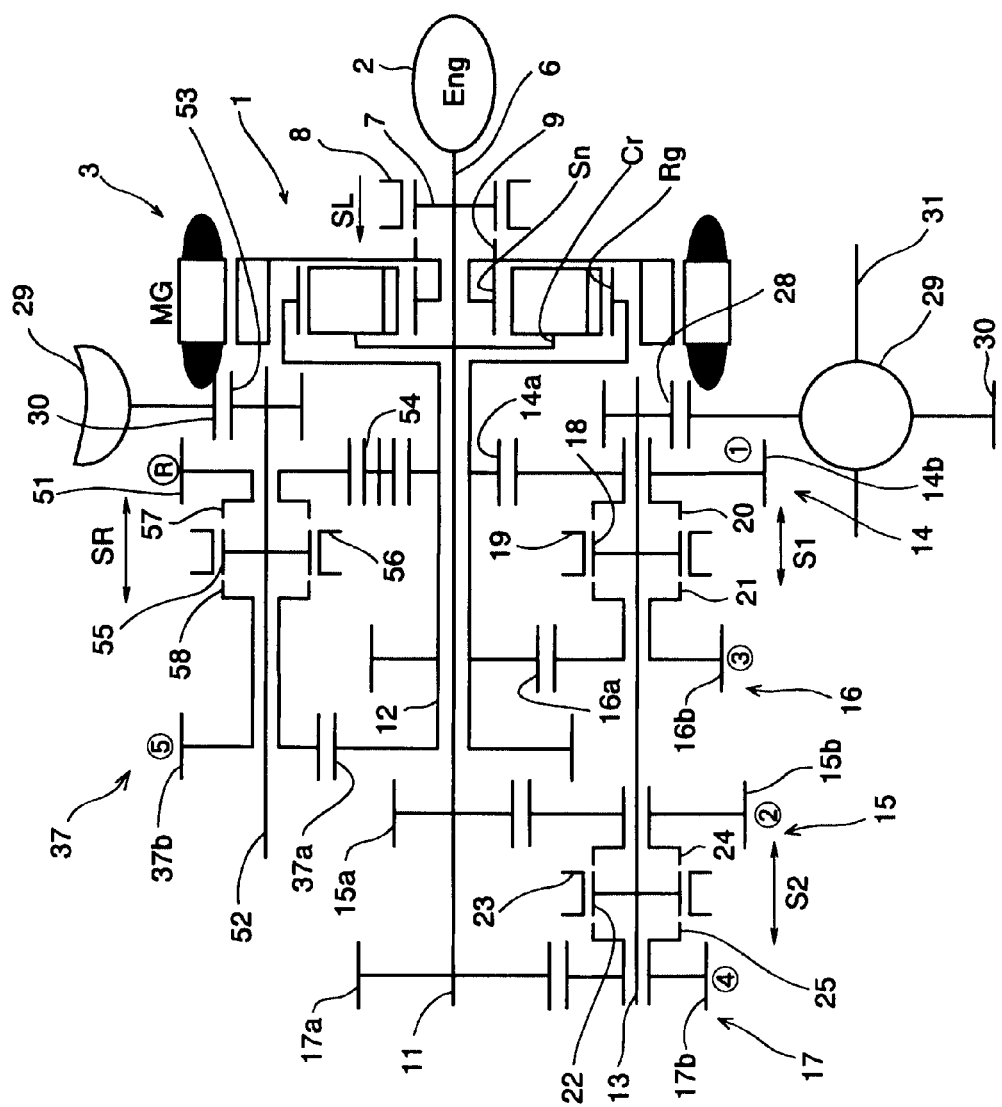
FIG. 12 is a skeleton diagram showing another example of a power transmission unit according to the present invention provided with a gear pair for setting a reverse stage.

Alternatively, the idle gear 54 may also be situated between the first drive gear 14a and the reverse driven gear 51. For this purpose, the power transmission unit shown in FIG. 10 is altered partially as shown in FIG. 12. Therefore, further explanation for the elements in common with those in FIG. 10 will be omitted by allotting common reference numerals to FIG. 12. Specifically, the power transmission unit shown in FIG. 12 is also provided with the reverse driven gear 51 held rotatably on the counter shaft 52, and the and the idle gear 54 is interposed between the reverse driven gear 51 and the first drive gear 14a to be engaged with the reverse driven gear 51 and the first drive gear 14a. Meanwhile, the counter gear 53 arranged on the counter shat 52 is engaged directly with the ring gear 30 of the differential 29.

The power transmission unit shown in FIG. 12 is adapted to set five forward stages. Specifically, the fifth drive gear 37b is arranged rotatably on the counter shaft 52 on the opposite side of the reverse driven gear 51b across the reverse clutch SR. The fifth drive gear 37b is integrated with a spline 58 as an element of the reverse clutch SR, and the spline 58 is adapted to be engaged with the sleeve 56 of the reverse clutch SR. Therefore, the reverse driven gear 51 is connected with the counter shaft 52 by moving the sleeve 56 toward the right side in FIG. 12 thereby engaging the sleeve 56 with the spline 57 of the reverse driven gear 51. Likewise, the fifth driven gear 37b is connected with the counter shaft 52 by moving the sleeve 56 toward the left side in FIG. 12 thereby engaging the sleeve 56 with the spline 58 of the fifth driven gear 37b.

On the other hand, the fifth drive gear 37a meshing with the fifth driven gear 37b to form the fifth gear pair 37 is arranged on the second drive shaft 12. Thus, the drive gears for setting the odd gear stages and the reverse stage are arranged on the second drive shaft 12, and the drive gears for setting the even gear stages are attached to the first drive shaft 11.

FIG. 13 is a table showing a relation between the gear stages set by the power transmission unit shown in FIG. 12, and engagement states of the clutches S1, S2, SR and SL under each gear stage. Specifically, the section of "5th stage" is added to the table of FIG. 11, therefore, definitions of the symbols in FIG. 13 are identical to those in FIG. 11. Specifically, according to the power transmission unit shown in FIG. 12, the fifth gear pair 37 is connected with the second drive shaft 12 and the counter shaft 52 by moving the sleeve 56 of the reverse clutch SR toward the fifth driven gear 37b side, as represented by ⑤ in FIG. 13. As a result, the torque outputted from the ring gear Rg of the planetary gear mechanism 1 is transmitted from the counter shaft 52 to the differential 29 through the counter gear 53, and the fifth stage is set according to the gear ratio of the fifth gear pair 37.

Likewise the example explained with reference to FIGS. 10 and 11, the reverse stage is set by moving the sleeve 56 of the reverse clutch SR toward the reverse driven gear 51 side thereby engaging the sleeve 56 with the spline 57, as represented by Ⓡ in FIG. 13. However, according to the example shown in FIG. 12, the idle gear 54 is situated between the first drive gear 14a and the reverse driven gear 51. Therefore, unlike the example shown in FIG. 10, the reverse driven gear 51 is rotated backwardly under the reverse stage. In addition, according to the example shown in FIG. 12, the reverse clutch SR is adapted to serve also as a clutch for setting the fifth stage. Therefore, the power transmission unit can be downsized entirely, and cost of the power transmission unit can be lowered.

The aforementioned lock clutch SL is provided to prevent the motor generator 3 from being driven in case of rotating the planetary gear mechanism 1 integrally. This means that it is not especially necessary to arrange the lock clutch SL if the planetary gear mechanism 1 is allowed to rotate integrally by driving the motor generator 3 as a motor or using the motor generator 3 as a generator. As described, the motor generator 3 can be connected directly with each drive shaft 11 and 12 by engaging the lock clutch SL. Therefore, the vehicle can be driven under the EV running mode by driving the motor generator 3 as a motor, and the energy can be regenerated by rotating the motor generator 3 as a generator when decelerating the vehicle. In case of thus driving the vehicle under EV running mode, or in case of thus regenerating the energy by the motor generator 3, the energy would be consumed wastefully if the engine 2 is rotated concurrently. In order to avoid such disadvantage, the engine 2 is preferably disconnected from the input shaft 6. An example provided with a mechanism for disconnecting the engine 2 will be explained hereinafter.

Figure 14:
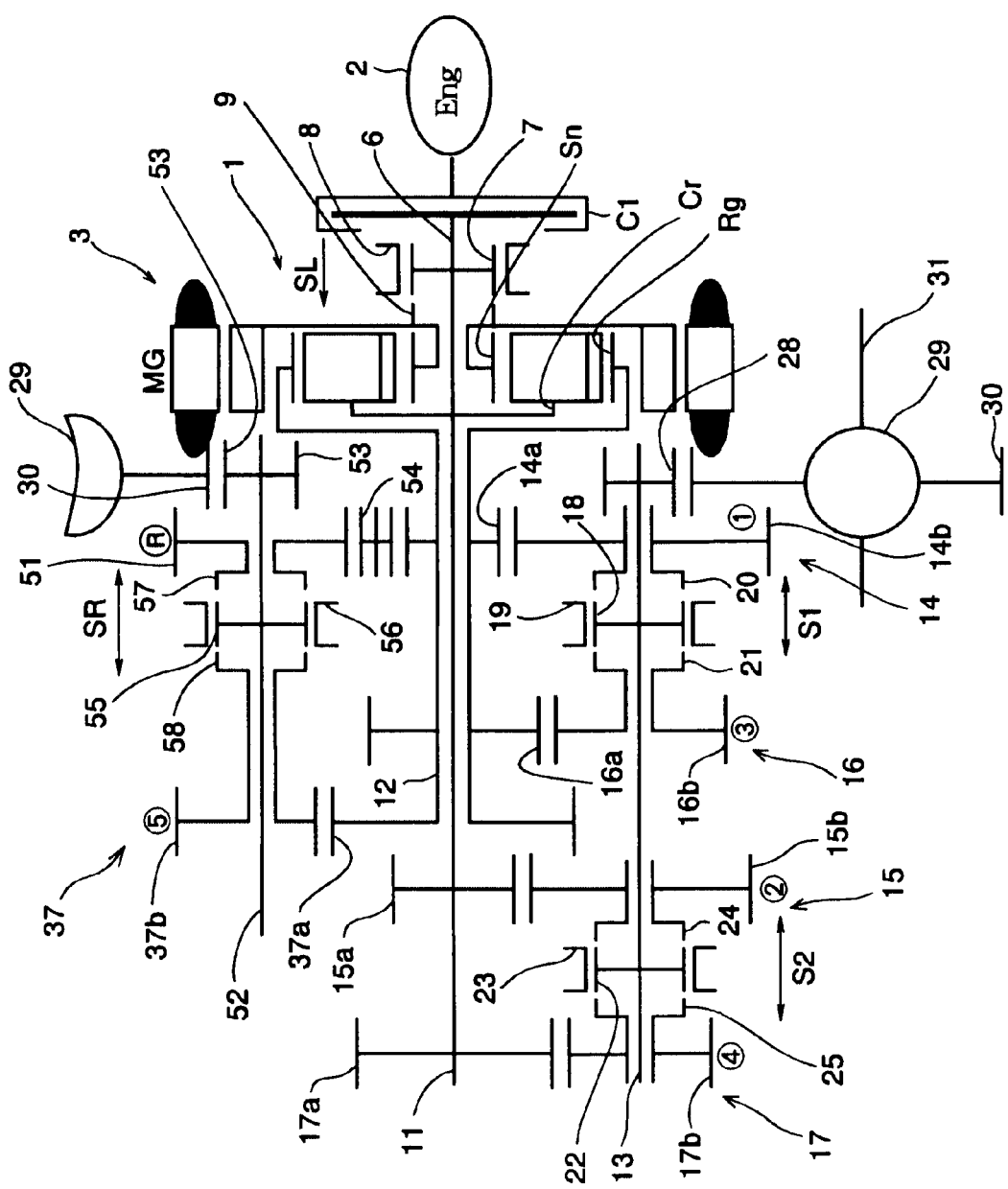
FIG. 14 is a skeleton diagram showing an example of a power transmission unit according to the present invention provided with a clutch for disconnecting the engine.

As shown in FIG. 14, a clutch (as will be tentatively called an input clutch hereinafter) C1 for connecting and disconnecting the engine 2 with/from the planetary gear mechanism 1 is arranged additionally in the example shown in FIG. 12. Specifically, the input clutch C1 is adapted to be engaged and disengaged electrically or hydraulically, and interposed between the input shaft 6 on which the lock clutch SL is arranged and the engine 2. In FIG. 14, the input clutch CL is represented by a symbol of a frictional clutch. Therefore, according to the example shown in FIG. 14, the engine 2 is connected with the planetary gear mechanism 1 through the input shaft 6 by engaging the input clutch C1. To the contrary, the engine 2 is disconnected from the input shaft 6 and the planetary gear mechanism 1 by disengaging the input clutch C1. The remaining configurations are identical to those of the example shown in FIG. 12.

Accordingly, relations between the gear stages set by the power transmission unit shown in FIG. 14, and engagement states of the clutches S1, S2 and SR under each gear stage are identical to those in the power transmission unit shown in FIG. 12, as shown in FIG. 15. Therefore, the definitions of the symbols in FIG. 15 are identical to those in FIG. 13.

FIG. 16 is a table showing relations between the gear stages set by the power transmission unit shown in FIG. 14, and engagement states of the lock clutch SL and the input clutch C1 under each gear stage. As described, the vehicle on which the power transmission unit of the present invention is mounted can be driven not only by the engine 2 (i.e., Eng running mode) but also by the motor generator 3 (i.e., EV running mode), and the lock clutch SL and the input clutch C1 are controlled under those running modes as explained below.

First of all, in case of Eng running mode, the input clutch C1 is engaged under every gear stages because the vehicle is driven by the engine 2. Therefore, the torque can be transmitted from the engine 2 to a drive wheel (not shown) to drive the vehicle, and an engine braking force can be established when the vehicle is decelerated by idling the engine 2 to utilize a resistance resulting from rotating the engine 2 compulsory. On the other hand, the lock clutch SL is engaged under the odd gear stages (i.e., under the first, third, and fifth stages) and the reverse stage, and disengaged under the even gear stages (i.e., under the second and fourth stages). That is, under the odd gear stages and the reverse stage, the power outputted from the engine 2 is transmitted to the second drive shaft 12 without increasing and decreasing the speed thereof. Therefore, the lock clutch SL is engaged and the planetary gear mechanism 1 is thereby integrated entirely.

Under the first stage and the reverse stage, the motor generator 3 is being rotated in a direction opposite to the rotational direction of the engine 2 before starting the vehicle or when the vehicle is stopped. Then, the torque is transmitted to the ring gear Rg functioning as an output member in the forward direction to start the vehicle, by increasing the rotational speed of the motor generator 3 in the forward direction (or reducing the rotational speed in the backward direction). Therefore, the lock clutch SL is disengaged when starting the vehicle, and then engaged while synchronizing rotational speeds of the rotary elements of the planetary gear 1 thereby rotating the planetary gear mechanism 1 entirely. Meanwhile, under the even gear stages, the power outputted from the engine 2 is transmitted to the first drive shaft 11 without increasing and decreasing the speed thereof. Therefore, the lock clutch SL is disengaged under the even gear stages.

In case of Ev running mode, the input clutch C1 is disengaged under every gear stage thereby preventing the engine 2 from being rotated concurrently and avoiding consuming the power wastefully. Therefore, the vehicle can be driven by transmitting the torque from the motor generator 3 to the drive wheel (not shown). Moreover, when the vehicle is decelerating, the energy can be regenerated and regenerative breaking force can be established by rotating the motor generator 3 compulsory by the inertia resulting from running the vehicle. As described, the engine 2 will not be rotated even in those cases, therefore, a regenerating efficiency of the energy can be improved. On the other hand, in case of Ev running mode, the lock clutch SL is kept engaged under every gear stage to transmit the power outputted from the motor generator 3 to the drive shafts 11 and 12 without increasing and decreasing the speed thereof. In other words, because the engine 2 does not function as a reaction against the planetary gear mechanism 1 under Ev running mode, the lock clutch SL has to be engaged under every gear stage to integrate the planetary gear mechanism 1. In addition, the engine 2 is disconnected from the input shaft 6 and the planetary gear mechanism 1 under Ev running mode, therefore, the engine 2 can be started by a starter motor (not shown) by connecting the starter motor with the engine 2. Alternatively, in case the engine 2 is provided with an alternator (not shown) as an auxiliary, the battery can be charged by driving the alternator by the engine 2 to generate electric energy.

According to the example shown in FIG. 14, a frictional clutch is used as the input clutch C1. Therefore, the input clutch C1 can be used as a torque limiter by setting an engagement force thereof to an engaging force required to drive the vehicle under normal running, or to an engagement force in which a suitable factor of safety to said engagement force for normal running. In this case, the torque will not act on the power transmission unit excessively even when breaking abruptly. Accordingly, it is not especially to enhance the strength of the power transmission unit and to enlarge the size of the power transmission unit. For this reason, the power transmission unit can be prevented from increasing in its weight so that the mountability of the power transmission unit will not be degraded. In addition, in case of using an elastic member or an elastic mechanism such as a spring or the like to apply an engagement force to the input clutch C1, the power will not be consumed to keep engaging the input clutch C1. Therefore, the fuel economy can be improved.

In addition, a torque transmitted by the frictional clutch can be limited or varied gradually by slipping the frictional torque, and such function can be utilized when starting the vehicle. Specifically, the vehicle can be started smoothly by increasing the drive torque by engaging the input clutch C1 composed of the frictional clutch gradually, even in case a state of charge (SOC) of the electric storage device for supplying the electric power to the motor generator 3 is insufficient or the temperature of the electric storage device is extremely low, or even in case the temperatures of the motor generator 3 and the inverter (not shown) are high or the motor generator 3 cannot be driven appropriately due to occurrence of a fail or the like.

Next, here will be explained an example in which the lock clutch SL is adapted to serve also as the aforementioned input clutch C1. According to the example shown in FIG. 17, a dog clutch adapted shift a sleeve thereof among three positions is used as the lock clutch SL. Specifically, in the example shown in FIG. 17, a hub 59 is arranged on the output shaft of the engine 2 to be situated adjacent to the hub 7 arranged on the output shaft 6 in the axial direction, and a spline to which the sleeve 8 is engaged is formed on an outer circumferential face of the hub 59. That is, the radially homogeneous hubs 59 and 7, and spline 9 integrated with the sun gear Sn of the planetary gear mechanism 1 are aligned coaxially.

The sleeve 8 has a sufficient axial length to be engaged with the hubs 59 and 7, and spline 9 simultaneously, and the sleeve 8 is adapted to be shifted by an actuator similar to the actuator 10 shown in FIG. 1 among: a position to be splined to the hub 7 and to the spline 9 thereby locking the planetary gear mechanism 1 (as will be tentatively called a position "A"); a position to be splined to the hubs 59 and 7, and to the spline 9 thereby locking the planetary gear mechanism 1 and connecting the engine 2 with the planetary gear mechanism 1 (as will be tentatively called a position "B"); and a position to be splined to the hubs 59 and 7 thereby connecting the engine 2 with the planetary gear mechanism 1 (as will be tentatively called a position "C"). The above-explained three positions are schematically shown in FIG. 18. In FIG. 18, such connection of the engine 2 with the planetary gear mechanism 1, and such locking of the planetary gear mechanism 1 are indicated by "X" and "○". That is, in FIG. 18, "X" represents the fact that the engine 2 is not connected with the planetary gear mechanism 1, and the fact that the planetary gear mechanism 1 is not locked. On the other hand, "○" represents the fact that the engine 2 is connected with the planetary gear mechanism 1, and the fact that the planetary gear mechanism 1 is locked.

Figure 17:
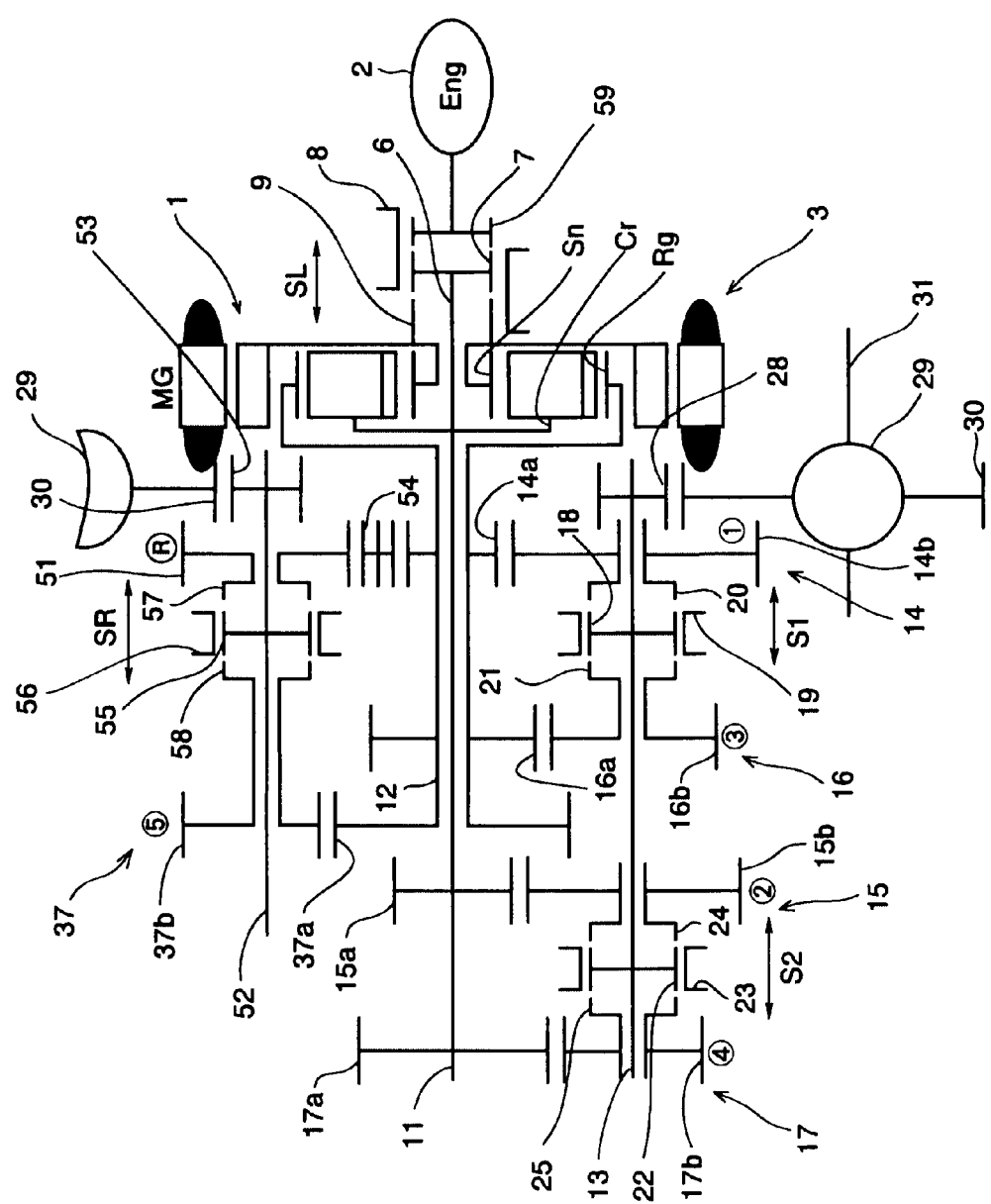
FIG. 17 is a skeleton diagram showing an example of a power transmission unit according to the present invention in which the lock clutch is adapted to function also as an input clutch.

FIG. 19 is a table showing relations between the gear stages set by the power transmission unit shown in FIG. 17, and engagement states of the clutches S1, S2 and SR under each gear stage. As can be seen from FIG. 19, the engagement states of the clutches S1, S2 and SR under each gear stage are identical to those in FIGS. 13 and 15. On the other hand, the sleeve 8 of the lock clutch SL is shifted among the aforementioned positions A to C depending on the driving mode such as the Eng running mode and the EV running mode, and also depending on the gear stage. Specifically, in case of starting the vehicle under the Eng running mode, the sleeve 8 is set to the position C under the first stage. Then, after the vehicle is started and when the rotational speeds of the rotary elements of the planetary gear mechanism 1 are synchronized so that the planetary gear mechanism 1 starts rotating integrally, the sleeve 8 is shifted to the position B. That is, the engine 2 is connected with the planetary gear mechanism 1 and the planetary gear mechanism 1 is allowed to perform a differential action by setting the sleeve 8 to the position C, and the planetary gear mechanism 1 is locked by shifting the sleeve 8 to the position B. As a result, the power outputted from the engine 2 is transmitted to the second drive shaft 12 as it is. The sleeve 8 of the lock clutch SL is also controlled in the same way under the reverse stage.

Under the second stage of Eng running mode, the sleeve 8 of the lock clutch SL is set to the position C. Therefore, the engine 2 is connected with the carrier Cr of the planetary gear mechanism 1, and the planetary gear mechanism 1 is unlocked to be allowed to perform differential action. As a result, the power outputted from the engine 2 is transmitted to the first drive shaft 11 as it is. The sleeve 8 of the lock clutch SL is also set to the position C under the fourth stage.

Under the third stage of Eng running mode, the sleeve 8 of the lock clutch SL is set to the position B. Therefore, the engine 2 is connected with the carrier Cr of the planetary gear mechanism 1, and the planetary gear mechanism 1 is locked to be rotated integrally. As a result, the power outputted from the engine 2 is transmitted to the second drive shaft 12 as it is. The sleeve 8 of the lock clutch SL is also set to the position B under the fifth stage.

Thus, the example shown in FIG. 17 is also capable of functioning as the power transmission unit shown in FIG. 14. Moreover, only one shifting mechanism is required to connect the engine 2 with the planetary gear mechanism 1 and to lock the planetary gear mechanism 1. Therefore, the power transmission unit can be structurally simplified so that the power transmission can be downsized and lightened. For this reason, the power transmission unit can be mounted on a vehicle easily and a cost thereof can be lowered.

The examples thus have been explained are adapted to set the gear stages according to the number of the speed change gear pairs. However, according to the present invention, the power transmission unit can also be adapted to set larger number of gear stages than the number of the speed change gear pair as will be explained hereinafter. Here, the definition of the "gear stage" is a speed change ratio to be set without relying on the positive torque and the negative torque of the motor generator 3.

Figures 20, 21:
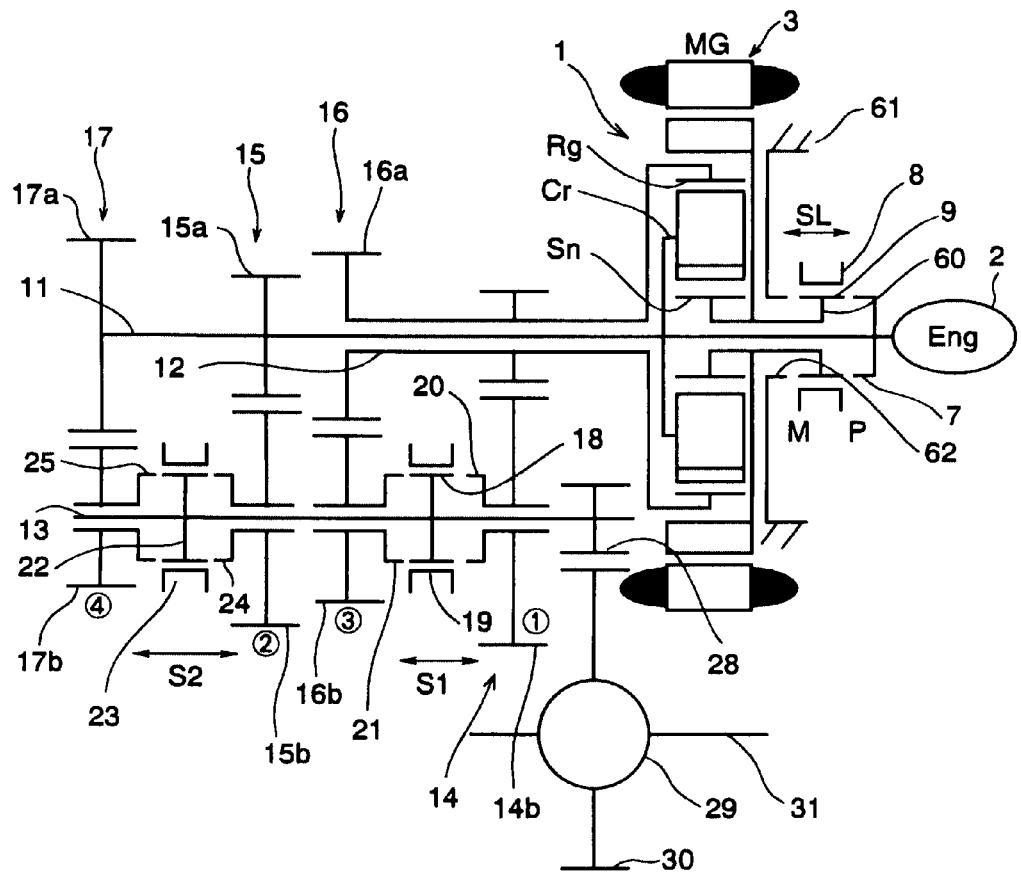
FIG. 20 is a skeleton diagram showing an example of a power transmission unit according to the present invention configured to lock the motor generator.
FIG. 21 is a table showing a relation between gear stages and engagement states of the clutches in the example shown in FIG. 20.

An example shown in FIG. 20 is an alternative of the example shown in FIG. 5, in which the lock clutch SL is adapted to halt the motor generator 3 connected with the sun gear Sn selectively. Specifically, the spline 9 is formed on an outer circumferential face of a hub 60 connected with a member integrated with the sun gear Sn or connecting the sun gear Sn with the motor generator 3. The hub 7 is arranged on the input shaft 6 closer to the engine 2 than the hub 60, and a fixed hub 62 is also arranged on the input shaft 6 on the opposite side of the hub 7 across the hub 60.

According to the example shown in FIG. 20, the sleeve 8 is also shifted by an actuator similar to the actuator 10 shown in FIG. 1 among: a position to be splined to the hub 60 and to the fixed hub 62 thereby locking the motor generator 3 (as will be tentatively called a position "M"); a position to be splined only to the hub 60 (as will be tentatively called a neutral position); and a position to be splined to the hubs 60 and 7 thereby locking the planetary gear mechanism 1 (as will be tentatively called a position "P"). The remaining elements are identical to those of the example shown in FIG. 4 or 5. Therefore, further explanation of those elements will be omitted by allotting common reference numerals to FIG. 20.

According to the power transmission unit shown in FIG. 20, under the first stage and the third stage, the power is transmitted from the planetary gear mechanism 1 to the second output shaft 12, and outputted to the output shaft 13 through the first gear pair 14 or the third gear pair 16 arranged on the second output shaft 12. Therefore, a gear stage where the speed change ratio is larger than that of the first stage, and a gear stage where the speed change ratio is larger than that of the third stage can be set by using the planetary gear mechanism 1 as a speed reducing mechanism. Relations between the gear stages set by the power transmission unit shown in FIG. 20, and engagement states of the clutches S1, S2 and SL under each gear stage is shown in FIG. 21.

Specifically, in case of setting the gear stage where the speed change ratio is larger than that of the first stage (i.e., UD+1st), the sleeve 19 of the clutch S1 for setting the odd gear stages is shifted toward the first driven gear 14b side thereby connecting the first driven gear 14b with the output shaft 13, and the sleeve 8 of the lock clutch SL is shifted from the neutral position to the position M thereby halting the sun gear Sn. When the sun gear Sn is thus halted, the carrier Cr connected with the engine 2 functions as an input element, the ring gear Rg connected with the second drive shaft 12 functions as an output element, and the sun gear Sn functions as a fixing element. Therefore, the ring gear Rg and the second drive shaft 12 integrated therewith are rotated at a speed being reduced to be lower than the rotational speeds of the carrier Cr and the engine 2. Then, the torque is outputted from the second drive shaft 12 to the output shaft 13 through the first gear pair 14. Thus, the planetary gear mechanism 1 and the first gear pair 14 reduce the speed between the engine 2 and the output shaft 13. As a result, the gear stage where the speed change ratio is larger than that of the first stage (i.e., UD+1st) is set.

Figure 22:
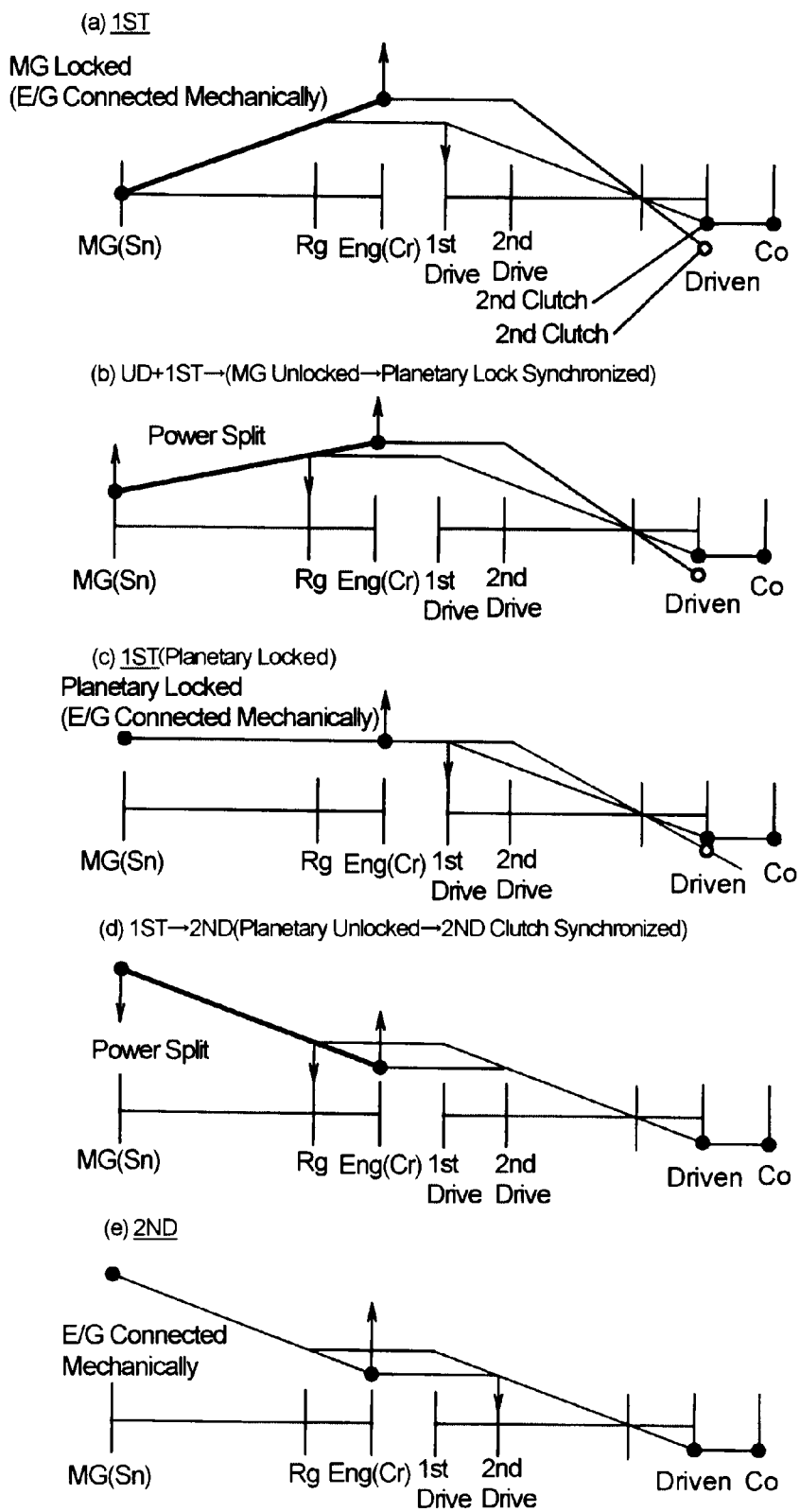
FIG. 22 is nomographic diagrams explaining situations of the example shown in FIG. 20 under each gear stages to the second stage, and a process of a synchronous control.

This situation is shown in a nomographic diagram of FIG. 22(a). Specifically, the sun gear Sn connected with the motor generator 3 is halted, and the torque of the engine 2 is inputted to the carrier Cr. Consequently, the ring gear Rg is rotated at the speed lower than the rotational speed of the carrier Cr, and the torque is transmitted from the first drive gear 14a which is substantially integrated with the ring gear Rg to the first driven gear 14b. The torque is further transmitted from the first driven gear 14b to the differential 29 through the output shaft 13 and the counter gear 28. Thus, this gear stage (i.e., UD+1st) is a directly connected stage, in which the power outputted from the engine 2 is transmitted to the output shaft 13 by the mechanical means, and the torque is outputted from the output shaft 13. That is, the power of the motor generator 3 is not used under this gear stage (i.e., UD+1st).

Here, this gear stage (i.e., UD+1st) is a starting stage. Therefore, the motor generator 3 is rotated backwardly by unlocking the lock clutch SL 1 just before starting the vehicle. In this situation, the motor generator 3 is used as a generator thereby increasing the reaction torque acting on the sun gear Sn gradually. As a result, the torque outputted from the ring gear Rg is increased gradually so that the vehicle is allowed to be started smoothly. Then, when the rotational speed of the sun gear Sn becomes zero, the sleeve 8 of the lock clutch SL is shifted to the position M thereby halting the sun gear Sn and the motor generator 3 integrated therewith.

Meanwhile, the first stage is set by locking the planetary gear mechanism 1 thereby rotating the planetary gear mechanism 1 integrally. For this purpose, the sleeve 8 of the lock clutch SL is shifted to the position P thereby connecting the sun gear Sn with the carrier Cr to lock the planetary gear mechanism 1. Those procedures for setting the first stage are as explained above. In case of upshifting to the first stage, the synchronous control is carried out to avoid or reduce the shift shock. Specifically, the sleeve 8 of the lock clutch SL is shifted to the neutral position thereby disengaging the lock clutch SL, and the rotational speed of the motor generator 3 is controlled electrically to zero.

In this situation, the rotational speed of the motor generator 3 is increased gradually in the forward direction in a manner not to vary the rotational speed and the torque of the ring gear Rg, and on the other hand, the rotational speed of the engine 2 is decreased gradually, as shown in the nomographic diagram of FIG. 22(b). Then, when the rotational speeds of the sun gear Sn, the carrier Cr, and the ring gear Rg are almost synchronized so that the planetary gear mechanism 1 is rotated integrally, the sleeve 8 of the lock clutch SL is shifted to the position P thereby locking the planetary gear mechanism 1 to prevent the planetary gear mechanism 1 from performing differential action, as shown in the nomographic diagram of FIG. 22(c).

Under the second stage, the power outputted from the engine 2 is outputted from the first drive shaft 11, as in the example shown in FIG. 5. In case of upshifting from the first stage to the second stage, the synchronous control is also carried out. Specifically, the lock clutch SL is disengaged, and the rotational speed of the sun gear Sn is increased and the rotational speed of the carrier Cr is decreased in a manner not to vary the rotational speed and the torque of the ring gear Rg. When the rotational speed of the sun gear Sn is increased by driving the motor generator 3 as a motor, the rotational speeds of the carrier Cr and the engine 2 are lowered, and the rotational speeds of the second drive gear 15a connected with the engine 2 through the first drive shaft 11 and the second driven gear 15b meshing therewith are also lowered gradually, as shown in the nomographic diagram of FIG. 22(d). Thus, the rotational speed of the second driven gear 15b is synchronized with the rotational speed of the output shaft 13. In this situation, the clutch S1 for setting the odd gear stages is disengaged, and the sleeve 23 of the clutch S2 for setting the even gear stages is shifted toward the second driven gear 15b side thereby connecting the second driven gear 15b with the output shaft 13, as shown in the nomographic diagram of FIG. 22(e). Here, the second stage is also a directly connected stage.

The gear stage between the second and the third stages (i.e., UD+3rd) is set by allowing the third gear pair 16 to transmit the torque between the second drive shaft 12 and the output shaft 13 by the clutch S1, and in this situation, the sleeve 8 of the lock clutch SL is shifted to the position M. Therefore, the planetary gear mechanism 1 functions to reduce the speed as in the case of the first stage, and the third gear pair 16 carries out a speed change between the engine 2 and the output shaft 13. As a result, the gear stage where the speed change ratio is larger than that of the third stage (i.e., UD+3rd) is set. Here, this gear stage (i.e., UD+3rd) is also a directly connected stage.

The fourth stage is set by allowing the fourth gear pair 17 to transmit the torque between the first drive shaft 11 and the output shaft 13 by the clutch S2, while disengaging the lock clutch SL, as in the case of the power transmission unit shown in FIG. 4. In addition, in case of carrying out a speed change operation to the adjacent stage, e.g., to the fourth stage, the shift shock can be avoided by carrying out the aforementioned synchronous control.

Thus, the power transmission unit shown in FIG. 20 is capable of setting the gear stage using the planetary gear mechanism 1 as a speed reducing mechanism under the condition to set the gear stage in which the torque is outputted through the planetary gear mechanism 1, more specifically, under the condition to set the gear stage in which the torque is outputted from the differential element of the planetary gear mechanism 1 which is connected neither with the engine 2 nor with the motor generator 3. Therefore, although the power transmission unit shown in FIG. 20 is provided with only four pairs of the speed change gear pairs, the power transmission unit shown in FIG. 20 is capable of setting six directly connected gear stages in total. That is, according to the power transmission unit shown in FIG. 20, extra gear stages can be set according to the number of the speed change gear pairs connected with the ring gear Rg, in addition to the number of the gear stages set according to the total number of the speed change gear pair. Alternatively, the number of the settable gear stage may also be increased by using the planetary gear mechanism 1 as a speed increasing mechanism depending on the configuration of the planetary gear mechanism.

Thus, according to the power transmission unit shown in FIG. 20, the required number of the speed change gear pair is smaller than the number of the settable gear stage. Therefore, the power transmission unit can be downsized so that the mountability thereof can be improved. Moreover, only one motor generator is required in the power transmission unit shown in FIG. 20, therefore, cost the power transmission unit shown in FIG. 20 can be reduced. Still moreover, according to the power transmission unit shown in FIG. 20, the gear stages are set by connecting the engine 2 mechanically with the output shaft 13. Therefore, the power transmission efficiency can be improved. Further, the power transmission unit shown in FIG. 20 is also capable of carrying out the aforementioned synchronous control, therefore, the shift shock can be avoided or minimized. Furthermore, the intermediate speed change ratio between the speed change ratios of the gear stages set by the speed change gear pairs can be set by the speed change action of the planetary gear mechanism 1. Therefore, even if the total gear range of the power transmission unit is widened by widening a difference between the largest speed change ratio and the smallest speed change ratio, each difference between the speed change ratios of adjoining gear stages can be narrowed. For this reason, power characteristics and fuel economy of the power transmission unit can be improved.

In order to shift to the adjoining gear stages smoothly, the aforementioned positions of the sleeve 8 of the lock clutch SL are preferably aligned in an order to increase or decrease the speed change ratio in order. Additionally, as shown in FIG. 20, it is preferable for the motor generator 3 to be situated on outer circumferential side of the planetary gear mechanism 1 while being overlapped at least partially with the planetary gear mechanism 1 in a radial direction. Consequently, the motor generator 3 is allowed to output relatively large torque by enlarging the size of the outer circumference thereof, and the number of the members aligned in the axial direction can be reduced so that the power transmission unit can be mounted on the vehicle easily. Moreover, as a result of arranging the lock clutch SL on the side closer to the engine 2 than the planetary gear mechanism 1, the lock clutch SL can be used commonly to lock the motor generator 3 and to lock the planetary gear mechanism 1. For this reason, number of the constitutional elements can be reduced so that the power transmission unit can be downsized entirely.

Figure 23:
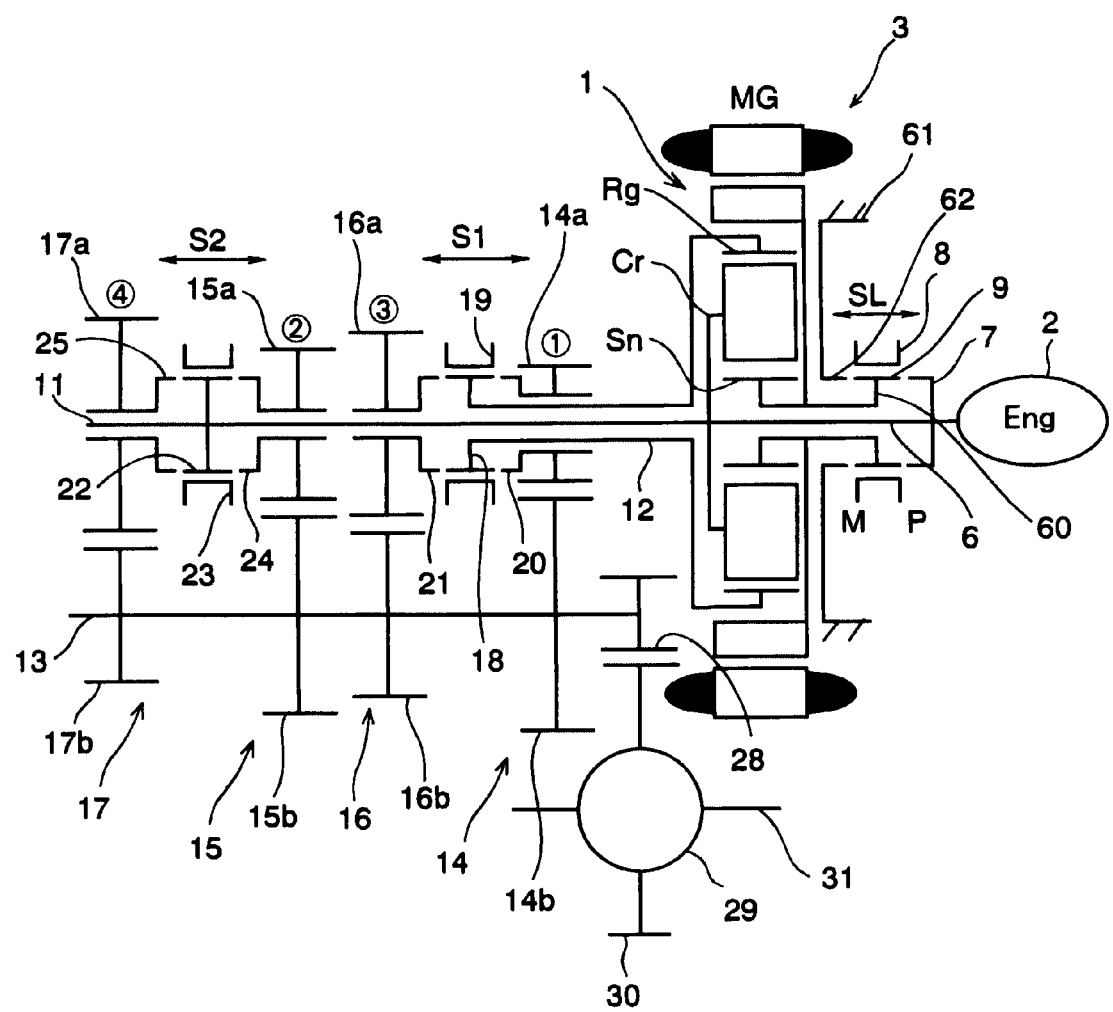
FIG. 23 is a skeleton diagram showing another example of a power transmission unit according to the present invention configured to halt the motor generator.

However, the configuration of the gear train to use the lock clutch SL for also locking the motor generator 3 or the sun gear Sn should not be limited to the example shown in FIG. 20. For example, according to the example shown in FIG. 23, the clutch S1 for setting the odd gear stages and the clutch S2 for setting the even gear stages are arranged on the drive shafts 11 and 12 side to form a gear train. That is, the example shown in FIG. 23 is an alternative of the example shown in FIG. 4, in which the planetary gear mechanism 1 is composed of a single pinion type planetary gear mechanism, and the lock clutch SL shown in FIG. 20 is arranged on the side closer to the engine 2 than the planetary gear mechanism 1. The example shown in FIG. 23 is also capable of setting six gear stages in total and achieving the advantages of the example shown in FIG. 20.

Figures 24, 25:
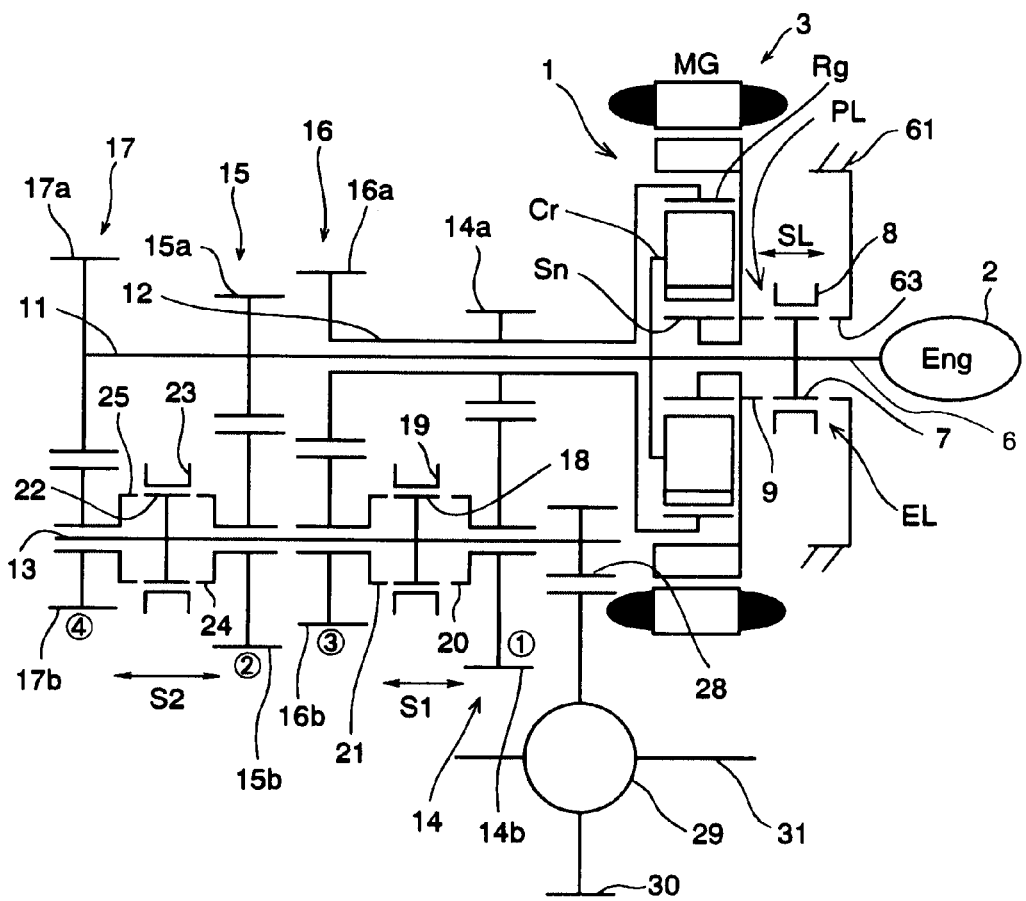
FIG. 24 is a skeleton diagram showing an example of a power transmission unit according to the present invention provided with a mechanism for locking the engine.
FIG. 25 is a table showing a relation between gear stages and engagement states of the clutches in the example shown in FIG. 24.

In the above-explained examples, the engine 2 is connected with the planetary gear mechanism 1 on the steady basis, or the engine 2 is disconnected from the planetary gear mechanism 1 selectively. However, according to the present invention, the power transmission unit may also be adapted to selectively halt the engine 2 and the rotary element of the planetary gear mechanism 1 connected therewith. Specifically, the example shown in FIG. 24 is an alternative of the example shown in FIG. 5, in which the lock clutch SL is adapted to lock the engine 2 selectively. As shown in FIG. 24, a fixed hub 63 fixed with a fixing member 61 is arranged on an opposite side of the planetary gear mechanism 1 across the hub 7 arranged on the input shaft 6.

In order to engage the fixed hub 63 with the sleeve 8, a spline is formed on the fixed hub 63, and the sleeve 8 is adapted to be shifted by an actuator similar to the actuator 10 shown in FIG. 1 among: a position to be splined to the spline 9 of the sun gear Sn side and to the hub 7 arranged on the input shaft 6 (as will be tentatively called a position "PL"); a position to be splined only to the hub 7 (as will be tentatively called a neutral position); and a position to be splined to the hub 7 and the fixed hub 63 (as will be tentatively called a position "EL"). The remaining elements are identical to those of the example shown in FIG. 5. Therefore, further explanation of those elements will be omitted by allotting common reference numerals to FIG. 23.

According to the power transmission unit shown in FIG. 24, four gear stages can be set by operating the clutches S1, S2 and SL as indicated in FIG. 25. The engagement states of the clutches S1 for setting the odd gear stages and the clutch S2 for setting the even gear stages under each gear stage ate identical to those in the above-explained examples. However, the engagement states of the lock clutch SL, that is, the positions of the sleeve 8 are different between the engine (Eng) running mode and the motor (EV) running mode. Specifically, in case of starting the vehicle under the first stage by the power of the engine 2, that is, in case of Eng running mode, the lock clutch SL being disengaged (as represented by "X" in FIG. 25) is engaged to prevent the planetary gear mechanism 1 from performing differential action, as in the above-explained examples. That is, the ring gear Rg functioning as an output element is rotated gradually in the forward direction by using the motor generator 3 being rotated backwardly as a generator to establish reaction force, and then, when the rotational speeds of the rotary elements of the planetary gear mechanism 1 are synchronized so that the planetary gear mechanism 1 is rotated integrally, the sleeve 8 of the lock clutch SL is shifted to the position PL thereby connecting the sun gear Sn with the carrier Cr. As a result, the vehicle is allowed to be started smoothly, and the first stage where the engine 2 is connected directly and mechanically is set.

Under the second stage, the lock clutch SL is disengaged to transmit the torque through the first drive shaft 11. In case of setting the third stage, the sleeve 8 of the lock clutch SL is shifted to the position PL thereby connecting the sun gear Sn with the carrier Cr. As a result, the planetary gear mechanism 1 is rotated integrally, and the engine 2 is connected with the second drive shaft 12. As in the case of setting the second stage, the lock clutch SL is disengaged in case of setting the fourth stage so as to transmit the torque through the first drive shaft 11. In addition, as the above-explained example, the power transmission unit shown in FIG. 24 is also capable of carrying out the synchronous control when carrying out the speed change operation to prevent an occurrence of a shift shock.

Figure 26:
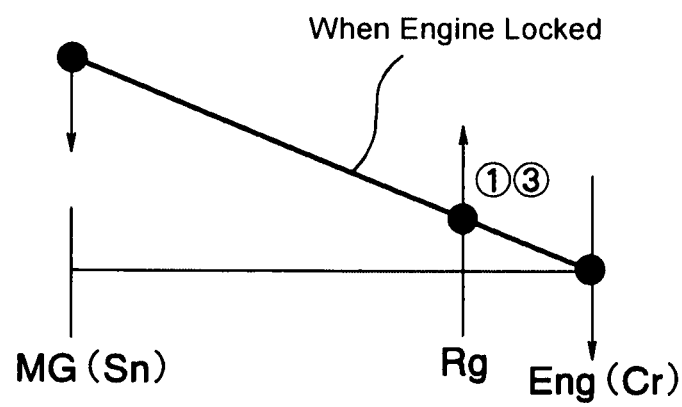
FIG. 26 is nomographic diagrams explaining operating states of the example shown in FIG. 24 in case the engine is locked, and in case the engine is not locked.
Figure 26:
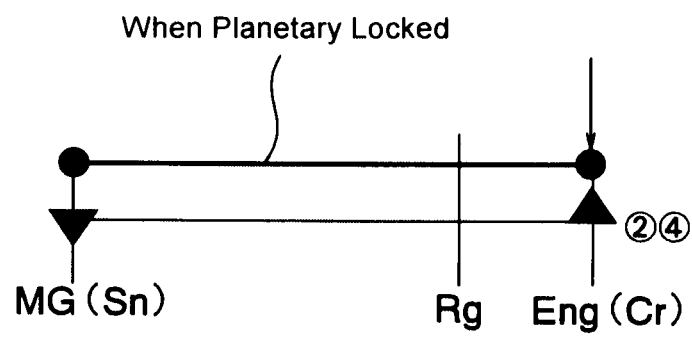

On the other hand, under the first stage of EV running mode, the sleeve 8 of the lock clutch SL is positioned at the position EL to halt the rotation of the engine 2 by connecting the engine 2 with the fixing member 61. Consequently, the carrier Cr of the planetary gear mechanism 1 is halted. In this situation, when the electric power is supplied to the motor generator 3 to drive the motor generator 3, the torque of the motor generator 3 is inputted to the sun gear Sn and outputted from the ring gear Rg as shown in the nomographic diagram of FIG. 26(a).

Specifically, the ring gear Rg functioning as an output element is rotated in the forward direction at a speed lower than the rotational speed of the sun gear Sn functioning as an input element of this case, and the torque of the motor generator 3 is outputted from the ring gear Rg while being increased. Therefore, a large driving force can be ensured even in case of Ev running mode so that the power transmission unit can be prevented from being enlarged. Moreover, the engine 2 will not be rotated concurrently so that the power loss can be reduced and the fuel economy can be improved. Even in case the vehicle is coasting while regenerating energy by rotating the motor generator 3 by inertia resulting from running the vehicle, the engine 2 will not be rotated by the regenerative energy. Therefore, regeneration efficiency can be improved. Furthermore, the rotational speed of the motor generator 3 becomes relatively high speed in this case so that the energy can be regenerated sufficiently.

Under the second stage of Ev running mode, the sleeve 8 of the lock clutch SL is shifted to the position PL thereby rotating the planetary gear mechanism 1 integrally. In this case, the rotary elements of the planetary gear mechanism 1 are rotated at the same speeds as shown in the nomographic diagram of FIG. 26(b). Therefore, the motor generator 3 and the engine 2 are rotated at the same speeds.

In case of Ev running mode, the third stage is set by operating the lock clutch SL as in the case of setting the first stage. On the other hand, the fourth stage is set by operating the lock clutch SL as in the case of setting the second stage.

Figure 27:
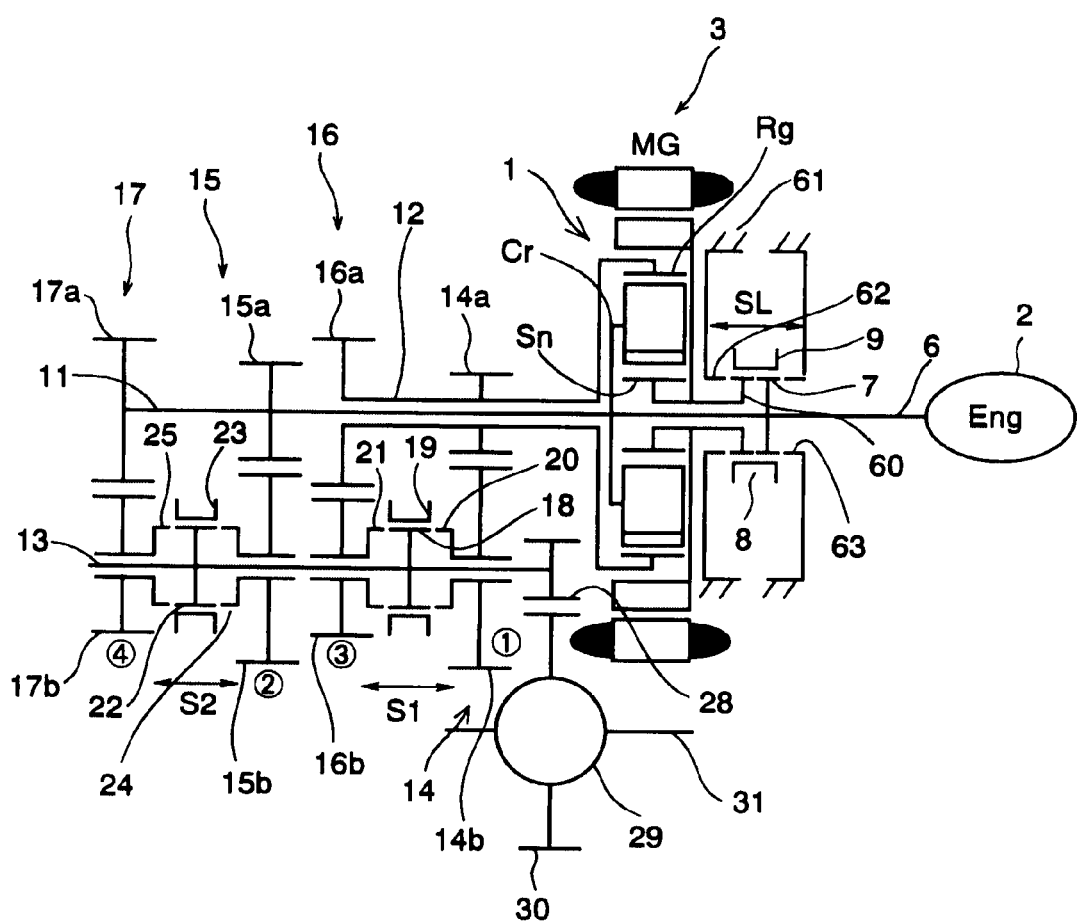
FIG. 27 is a skeleton diagram showing an example of a power transmission unit according to the present invention configured to lock the engine and the motor generator selectively.

As shown in FIG. 27, the above-mentioned mechanism for locking the engine 2 can be arranged in the example shown in FIG. 20. Specifically, the hub 60 integrated with the motor generator 3 and the hub 7 arranged on the input shaft 6 are arranged adjacent to each other. The fixed hub 62 for locking the motor generator 3 is arranged on the opposite side of the hub 7 across the hub 60, and a fixed hub 63 for locking the engine 2 is arranged on the opposite side of the fixed hub 62 across the hubs 60 and 7.

Figures 28, 29:
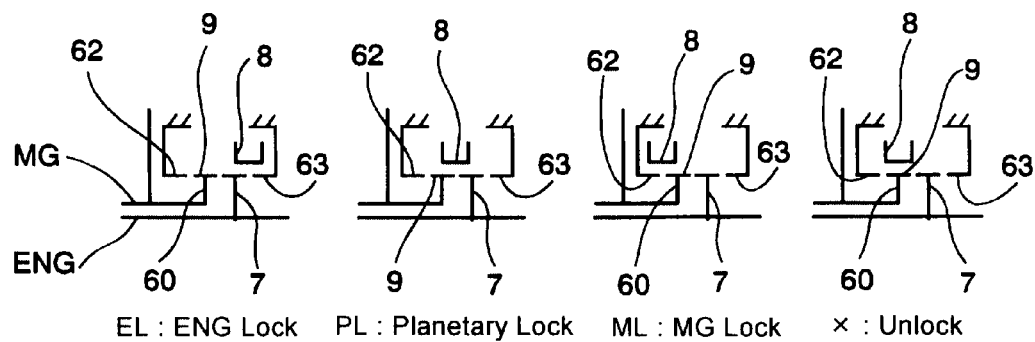
FIG. 28 is a view showing four position of a sleeve of the lock clutch in the example shown in FIG. 27.
FIG. 29 is a table showing a relation between gear stages and engagement states of the clutches in the example shown in FIG. 27.

According to the example shown in FIG. 27, the sleeve 8 of the lock clutch SL is adapted to be shifted among four positions shown in FIG. 28 in an expanded scale. Specifically, the sleeve 8 is shifted among: a first position to be splined to the hub 7 arranged on the input shaft 6 and to the fixed hub 63 for locking the engine 2 (as will be tentatively called a position "EL"); a second position to be splined to the hub 60 integrated with the motor generator 3 and to the hub 7 arranged on the input shaft 6 (as will be tentatively called a position "PL"); a third position to be splined to the hub 60 integrated with the motor generator 3 and to the adjoining fixed hub 62 (as will be tentatively called a position "ML"); and a fourth position to be splined only one of the hubs such as the hub 7 or the like. That is, the fourth position is a disconnecting position where the sleeve 8 does not connect the hubs.

In case the power transmission unit is adapted to lock the motor generator 3, it is possible to set an intermediate stage where the speed change ratio is larger than that of the gear stage in which the torque is outputted through the planetary gear mechanism 1. That is, the power transmission unit shown in FIG. 27 is also capable of setting such intermediate stages. FIG. 29 is a table showing a relation between the gear stages set by the power transmission unit shown in FIG. 27, and engagement states of the clutches S1, S2 and SL under each gear stage. According to the example shown in FIG. 29, the Eng running mode is achieved by connecting the first driven gear 14b with the output shaft 13 by the clutch S1, and locking (or halting) the motor generator 3 by shifting the sleeve 8 of the lock clutch SL to the aforementioned position ML. Since the planetary gear mechanism 1 functions as a speed reducing mechanism under the Eng running mode, the gear stage where the speed change ratio is larger than that of the first stage (i.e., UD+1st) can be set.

As in the case of setting the gear stage where the speed change ratio is larger than that of the first stage (i.e., UD+1st), the intermediate stage where the speed change ratio is between the speed change ratios of the second and the third stages (i.e., UD+3rd) can be set by connecting the third driven gear 16b with the output shaft 13 by the clutch S1, and locking (or halting) the motor generator 3 by shifting the sleeve 8 of the lock clutch SL to the aforementioned position ML thereby allowing the planetary gear mechanism 1 to function as a speed reducing mechanism. As in the case of aforementioned examples shown in FIGS. 20 and 23, in case of starting the vehicle under the gear stage where the speed change ratio is larger than that of the first stage (i.e., UD+1st), the drive torque is increased gradually by disengaging the lock clutch SL while establishing a reaction force by the motor generator 3 against the sun gear Sn, and the motor generator 3 is locked after synchronizing the rotational speeds of the rotary elements of the planetary gear mechanism 1.

Under the first and the third stage of Eng running mode, the planetary gear mechanism 1 is locked to be rotated integrally, and the torque is outputted from the planetary gear mechanism 1 through the second drive shaft 12. Therefore, the sleeve 8 of the lock clutch CL is shifted to the position PL to be splined to the hub 60 integrated with the motor generator 3 and to the hub 7 arranged of the input shaft 6. That is, the planetary gear mechanism 1 is rotated integrally by connecting the sun gear Sn with the carrier Cr thereof, as in the case of the example shown in FIG. 20.

Under the second and the fourth stage of Eng running mode, the second driven gear 15b or the fourth driven gear 17b is connected with the output shaft 13 by the clutch S2, and the power outputted from the engine 2 is transmitted from the first drive shaft 11 to the second gear pair 15 or the fourth gear pair 17. Therefore, the lock clutch SL is disengaged as in the example shown in FIG. 20.

On the other hand, in case of Ev running mode, the engine 2 is locked under the gear stages in which the power is transmitted to the second drive shaft 12 through the planetary gear mechanism 1. Specifically, in case the first driven gear 14b or the third driven gear 16b is connected with the output shaft 13 by the clutch S1, the sleeve 8 of the lock clutch SL is shifted to the position EL. As a result, the carrier Cr of the planetary gear mechanism 1 is halted together with engine 2 so that the planetary gear mechanism 1 is allowed to function as a speed reducing mechanism. Therefore, the gear stage where the speed change ratio is larger than that of the first stage (i.e., UD+1st) and the gear stage where the speed change ratio is larger than that of the third stage but smaller than that of the second stage (i.e., UD+3rd) can be set. Thus, according to the example shown in FIG. 27, four gear stages can be set in total.

Meanwhile, as in the case of the examples shown in FIGS. 20 and 24, the sleeve 8 of the lock clutch SL is shifted to the position PL to be splined to the hubs 60 and 7 under the even gear stages of Ev running mode thereby connecting the sun gear Sn with the carrier Cr of the planetary gear mechanism 1, so as to connect the motor generator 3 with the first drive shaft 11 directly.

Therefore, as the example shown in FIG. 24, the power transmission unit shown in FIG. 27 is also capable of improving the energy efficiency under the motor running mode and when regenerating energy, as well as achieving the advantages of the aforementioned examples. In addition, it is advantageous to adapt the lock clutch SL to lock the engine 2. However, according to the present invention, the mechanism for locking the engine 2 should not be limited to the aforementioned lock clutch SL. For example, a brake mechanism or a clutch mechanism may be arranged separately to lock the engine 2. Here, the energy efficiency will not be degraded even if such separated brake mechanism or the clutch mechanism is employed to lock the engine 2.

Thus, the lock clutch SL as thus far explained corresponds to the disconnecting mechanism, the selective engagement mechanism, the electric motor locking mechanism and the engine locking mechanism of the present invention depending on the configuration and function thereof, and the reverse clutch SR corresponds to the shifting mechanism of the present invention.

The invention claimed is:

1. A power transmission unit with an engine; a plurality of speed change gear pairs, each of which has a different gear ratio, and to which a power outputted from the engine is transmitted; and an output member for outputting the power transmitted from the speed change gear pair, the power transmission unit comprising:

a differential mechanism which performs a differential action, the differential mechanism includes a planetary gear mechanism comprising a sun gear as an external gear; a ring gear as an internal gear, which is arranged concentrically with the sun gear; and a carrier, which holds a pinion gear arranged between the sun gear and the ring gear in a rotatable and revolvable manner, and the carrier is connected with the engine;

an electric motor, which is connected with the sun gear;

a first drive shaft connected with the carrier and a second drive shaft connected with the ring gear, the first and second drive shafts being arranged concentrically with each other and coaxially with a rotational center of the planetary gear mechanism, the first drive shaft being longer than the second drive shaft and protruding from the second drive shaft, wherein the plurality of speed change gear pairs include a first gear pair and a third gear pair which are adapted to be connected with the carrier and the output member, and a second gear pair and a fourth gear pair which are adapted to be connected with the ring gear and the output member, a drive gear of the first gear pair and a drive gear of the third gear pair are provided on the first drive shaft, a drive gear of the second gear pair and a drive gear of the fourth gear pair are provided on the second drive shaft, and driven gears of the first, second, third, and fourth gear pairs are arranged on the output member and directly mesh with the drive gears of the first, second, third, and fourth gear pairs, respectively, and the power transmission unit further comprising:

a starting means, which connects the second gear pair with the ring gear and the output member when the power is outputted to the output member to start a vehicle while allowing the differential mechanism to perform differential action and allowing the electric motor to establish a reaction force so that the power of the engine is amplified and outputted to the ring gear, and then prevents the differential mechanism from performing differential action, under a condition that the engine is driven and is connected to the carrier, by connecting the carrier and the sun gear with each other to lock the planetary gear mechanism.

2. The power transmission unit as claimed in claim 1, further comprising:
a motoring/regenerating means, which connects any one of the speed change gear pairs with the output member and any one of the carrier, sun gear, or ring gear, which activates the electric motor, and which prevents the differential mechanism from performing differential action, under the condition where the engine is connected to the carrier and is not driven.

3. The power transmission unit as claimed in claim 1, further comprising:
a motoring/regenerating means, which connects the second gear pair with the output member and the ring gear, which activates the electric motor, and which unlocks the differential mechanism thereby allowing the differential mechanism to perform differential action, under the condition where the engine is connected to the carrier and is not driven.

4. The power transmission unit as claimed in claim 3, wherein:
the motoring/regenerating means includes a means for unlocking the differential mechanism in case the rotational speed of the electric motor is higher than that of the engine, and a torque of the electric motor is balanced with a friction torque of the engine.

5. The power transmission unit as claimed in of claim 1, wherein:
the output member includes two output shafts arranged parallel to each other; and
driven gears of the speed change gear pairs are arranged on those output shafts at a distance.

6. The power transmission unit as claimed in claim 5, wherein:
driven gears of every other speed change gear pairs are arranged in order of gear ratios thereof on one of the output shafts; and
driven gears of the remaining speed change gear pairs are arranged on the other output shaft.

7. The power transmission unit as claimed in claim 5, wherein:
a clutch mechanism for connecting the driven gears on the output shaft selectively with the output shaft is arranged on each output shaft; and
one of the clutch mechanisms is arranged on an opposite side of the other clutch mechanism in the axial direction across the driven gears.

8. The power transmission unit as claimed in claim 5, comprising:
six speed change gear pairs for driving the vehicle in the forward direction; and
wherein driven gears of four of said six gear pairs are arranged on one of the output shafts in a manner to be connected therewith selectively; and
wherein driven gears of the remaining two gear pairs are arranged on the other output shaft in a manner to be connected therewith selectively.

9. The power transmission unit as claimed in claim 8, further comprising:
a first clutch mechanism, which allows a gear pair of the largest gear ratio and a gear pair of the smallest gear ratio arranged adjacent to each other on one of the output shafts to transmit the torque selectively to said one of the output shafts;
a second clutch mechanism, which allows a first odd gear pair whose gear ratio is smaller than the largest gear ratio to set a gear stage two stages higher than the gear stage of the largest gear ratio, and a second odd gear pair whose gear ratio is smaller than that of the first odd gear pair to set a gear stage two stages higher than the gear stage set by the first odd gear pair, which are arranged adjacent to each other on the other output shaft, to transmit the torque selectively to said other output shaft; and
a third clutch mechanism, which allows a first even gear pair whose gear ratio is smaller than the largest gear ratio to set a gear stage one stage higher than the gear stage of the largest gear ratio, and a second even gear pair whose gear ratio is smaller than that of the first even gear pair to set a gear stage two stages higher than the gear stage set by the first even gear pair, which are arranged adjacent to each other on said one of the output shafts, to transmit the torque selectively to said one of the output shafts.

10. The power transmission unit as claimed in claim 1, further comprising:
a reverse mechanism which outputs a torque transmitted thereto from the differential mechanism while reversing a direction of the torque to be opposite to that of the torque transmitted to the output member through the speed change gear pair.

11. The power transmission unit as claimed in claim 10, wherein:
the reverse mechanism comprises a shifting mechanism which connects the output member selectively with the ring gear.

12. The power transmission unit as claimed in claim 1, further comprising:
a disconnecting mechanism which disconnects the engine from the carrier thereby preventing the torque to be transmitted to the carrier.

13. The power transmission unit as claimed in claim 12, wherein the disconnecting mechanism includes a selective engagement mechanism, which is capable of shifting a sleeve thereof among:
a first position, where the engine is disconnected from the carrier, and any of the carrier, sun gear, or ring gear are connected with each other to lock the differential mechanism;
a second position, where the engine is connected with the carrier, and any of the carrier, sun gear, or ring gear are connected with each other to lock the differential mechanism; and
a third position, where the engine is connected with the carrier, and the carrier, sun gear, or ring gear connected with each other are disconnected from each other to unlock the differential mechanism.

14. The power transmission unit as claimed in claim 1, further comprising:
an electric motor locking mechanism which halts a rotation of the electric motor.

15. The power transmission unit as claimed in claim 14, wherein:

the electric motor locking mechanism includes a mechanism, which halts the rotation of the electric motor in case the second gear pair is connected with the ring gear and the output member.

16. The power transmission unit as claimed in claim 1, further comprising:
   an engine locking mechanism which halts a rotation of the engine.

17. The power transmission unit as claimed in claim 16, wherein:
   the engine locking mechanism includes a mechanism, which is adapted to halt the rotation of the engine in case the second gear pair is connected with the ring gear and the output member, and the electric motor is driven.

18. The power transmission unit as claimed in claim 16, wherein the engine locking mechanism includes a mechanism capable of shifting a sleeve thereof selectively among:
   a first position, where the rotation of the engine is halted;
   a second position, where any of the carrier, sun gear, or ring gear are connected with each other to lock the differential mechanism; and
   an electric motor locking position, where the rotation of the electric motor is halted.

19. The power transmission unit as claimed in claim 1, further comprising:
   a first clutch which selectively connects the first driven gear and the third driven gear with the output member; and
   a second clutch which selectively connects the second driven gear and the fourth driven gear with the output member.

20. The power transmission unit as claimed in claim 1, wherein the starting means includes a lock clutch which selectively connects the carrier and the sun gear by meshing a sleeve of the lock clutch with a spline formed on a member integrated with the sun gear or a member connecting the sun gear with the electric motor,
   the lock clutch includes a hub formed on an input shaft connecting the engine with the carrier, and the sleeve which is engaged with a spline formed on an outer circumferential face of the hub and which moves in an axial direction of the hub and rotates integrally with the hub, and
   the carrier and the sun gear being connected with each other by moving the sleeve toward a sun gear side.

* * * * *